United States Patent
Satake et al.

(10) Patent No.: US 11,971,479 B2
(45) Date of Patent: Apr. 30, 2024

(54) ULTRASONIC SENSOR

(71) Applicant: DENSO CORPORATION, Kariya (JP)

(72) Inventors: Masayoshi Satake, Nisshin (JP); Youhei Suzuki, Nisshin (JP); Kensuke Kobayashi, Nisshin (JP); Dai Kondo, Kariya (JP); Syoya Ishida, Nisshin (JP); Yudai Yamamoto, Nisshin (JP); Kenji Fukabori, Kariya (JP)

(73) Assignee: DENSO CORPORATION, Kariya (JP)

(*) Notice: Subject to any disclaimer, the term of this patent is extended or adjusted under 35 U.S.C. 154(b) by 247 days.

(21) Appl. No.: 17/519,326

(22) Filed: Nov. 4, 2021

(65) Prior Publication Data
US 2022/0057507 A1    Feb. 24, 2022

Related U.S. Application Data

(63) Continuation of application No. PCT/JP2020/017818, filed on Apr. 24, 2020.

(30) Foreign Application Priority Data

May 6, 2019   (JP) ................................. 2019-087230
Apr. 17, 2020  (JP) ................................. 2020-074424

(51) Int. Cl.
*G01S 15/931*    (2020.01)
*G01S 7/521*     (2006.01)

(52) U.S. Cl.
CPC ............ *G01S 15/931* (2013.01); *G01S 7/521* (2013.01); *G01S 2015/938* (2013.01)

(58) Field of Classification Search
CPC ... G01S 15/931; G01S 7/521; G01S 2015/938

USPC ............................................................ 367/93
See application file for complete search history.

(56) References Cited

U.S. PATENT DOCUMENTS

| | | | | |
|---|---|---|---|---|
| 2007/0115758 A1* | 5/2007 | Kojima | ................ | G10K 11/004 367/197 |
| 2013/0081470 A1* | 4/2013 | Kim | .................... | G01N 29/2437 29/25.35 |
| 2014/0347959 A1* | 11/2014 | Hirakawa | ............ | G10K 11/004 367/140 |

(Continued)

FOREIGN PATENT DOCUMENTS

| | | |
|---|---|---|
| JP | 2-288500 A | 11/1990 |
| JP | 11-237468 A | 8/1999 |

(Continued)

*Primary Examiner* — Kerri L McNally
(74) *Attorney, Agent, or Firm* — MASCHOFF BRENNAN

(57) ABSTRACT

An ultrasonic sensor is provided with an ultrasonic element that converts between an electrical signal and an ultrasonic vibration and an element accommodating case having a bottomed cylindrical shape and accommodating the ultrasonic element inside thereof. The element accommodating case includes a side plate portion formed in a cylindrical shape that surrounds a directional center axis, and a bottom plate portion that closes one end side of the side plate portion in an axial direction which is parallel to the directional center axis. The ultrasonic element is attached to the bottom plate portion. The bottom plate portion includes at least one protrusion. The protrusions vibrate together with the bottom plate portion when the bottom plate portion vibrates as an ultrasonic vibration.

17 Claims, 14 Drawing Sheets

(56) References Cited

U.S. PATENT DOCUMENTS

2014/0355382 A1* 12/2014 Tsuji ................. G01S 15/04
367/87

FOREIGN PATENT DOCUMENTS

| | | |
|---|---|---|
| JP | 2010-278594 A | 12/2010 |
| JP | 2010-278913 A | 12/2010 |
| WO | 2016147917 A1 | 9/2016 |

* cited by examiner

ULTRASONIC SENSOR

CROSS-REFERENCE TO RELATED APPLICATION

This application is the U.S. bypass application of International Application No. PCT/JP2020/017818 filed on Apr. 24, 2020, which designated the U.S. and claims priority to Japanese Patent Application Nos. 2019-087230 and 2020-074424 which are filed on May 6, 2019, and filed Apr. 17, 2020 respectively, the entire disclosure of which are incorporated herein by reference.

BACKGROUND

Technical Field

The present disclosure relates to an ultrasonic sensor.

Description of the Related Art

For example, an ultrasonic sensor transmitting ultrasonic waves as probing waves towards outside and receiving their reflected waves is used for an object detecting apparatus which is mounted on a vehicle. This type of ultrasonic sensor is configured of a bottomed cylindrical case and a piezoelectric element attached to an inner bottom portion of the case.

SUMMARY

According to one aspect of the present disclosure, an ultrasonic sensor is provided with an ultrasonic element that converts between an electrical signal and an ultrasonic vibration and an element accommodating case having a bottomed cylindrical shape and accommodating the ultrasonic element inside thereof, in which the element accommodating case includes a side plate portion formed in a cylindrical shape that surrounds a directional center axis, and a bottom plate portion that closes one end side of the side plate portion in an axial direction which is parallel to the directional center axis, the ultrasonic element is attached to the bottom plate portion, and the bottom plate portion includes at least one protrusion; and the protrusions vibrate together with the bottom plate portion when the bottom plate portion vibrates as ultrasonic vibration.

DETAILED DESCRIPTION OF PREFERRED EMBODIMENTS

An ultrasonic sensor is known. For example, an ultrasonic sensor transmitting ultrasonic waves as probing waves towards outside and receiving their reflected waves is used for an object detecting apparatus which is mounted on a vehicle. This type of ultrasonic sensor is configured of a bottomed cylindrical case and a piezoelectric element attached to an inner bottom portion of the case. In this type of ultrasonic sensor, a structure in which a single ultrasonic sensor has a plurality of resonance frequencies is considered. For example, Japanese patent application laid-open publication No. 2010-278594 discloses this sensor structure. The ultrasonic sensor disclosed by the above-mentioned patent literature is provided with two bottomed cylindrical cases having different sizes, and a piezoelectric element, in which an opening portion of a smaller bottomed cylindrica case is attached to an inner bottom surface of a larger bottomed cylindrical case, and a space is formed by the smaller bottomed cylindrical case. In this ultrasonic sensor, a piezoelectric element is attached to an outer bottom surface of the smaller bottomed cylindrical case. Moreover, this ultrasonic sensor is configured such that bottom surfaces of the large and small cases are bent in the same direction or bent in opposite directions, thereby having a plurality of resonance frequencies.

However, this type of ultrasonic sensor has a structure in which the small and large bottomed cylindrical bodies are bonded, which may cause significant deterioration in the durability. Hence, the manufacturing cost thereof will be increased.

Hereinafter, with reference to the drawings, embodiments of the present disclosure will be described. For portions mutually the same or equivalent, it will be descried with the same reference symbols.

First Embodiment

An ultrasonic sensor 1 according to a first embodiment will be described. The ultrasonic sensor 1 is suitable for being utilized for an object detection apparatus mounted on a vehicle such as a car. However, the ultrasonic sensor 1 is not limited thereto and may be utilized in another applications. According to the present disclosure, as a typical example, an example in which the ultrasonic sensor is applied to an object detecting apparatus for a vehicle will be described.

(Example of Mounting)

Figure 1:
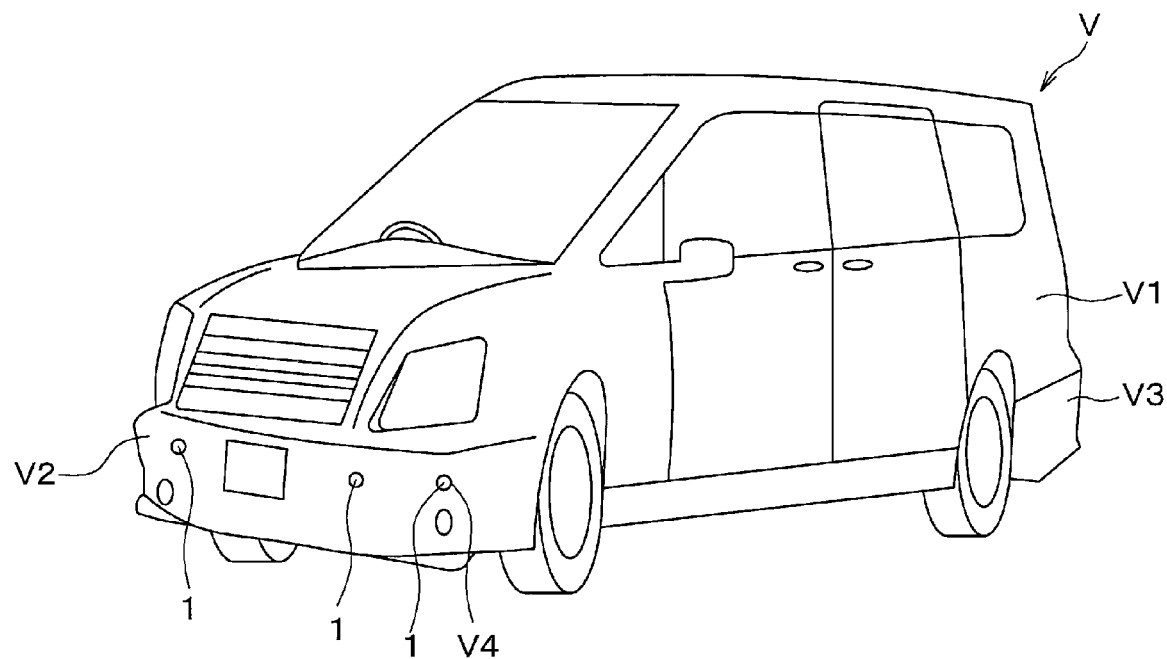
FIG. 1 is a diagram showing an example of mounting state of ultrasonic sensors according to a first embodiment.

An example of the ultrasonic sensor 1 mounted to a vehicle will be simply described with reference to FIG. 1. For example, as shown in FIG. 1, the ultrasonic sensor 1 is mounted to a vehicle V provided with a vehicle body V1 having a box-shape. Specifically, the ultrasonic sensor 1 is mounted to a front bumper V2 attached to a front end portion in the vehicle body or a rear bumper V3 attached to a rear end portion in the vehicle body.

In the front bumper V2 and the rear bumper V3, an attachment hole V4 as an insertion hole for mounting the ultrasonic sensor 1 is formed. The ultrasonic sensor 1 mounted to the front bumper V2 or the rear bumper V3 are referred to as so-called on-vehicle clearance sonar.

(Configuration)

Figure 3:
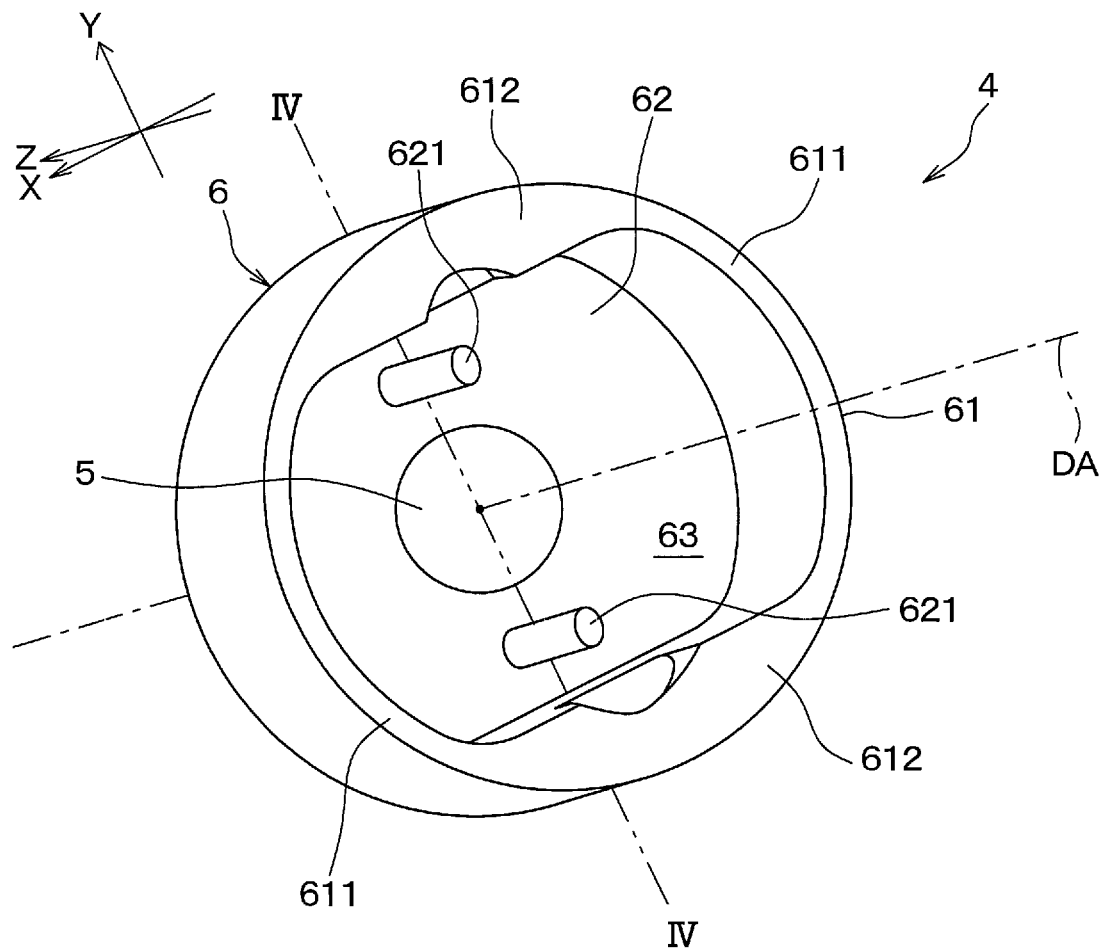
FIG. 3 is a perspective view showing an overall configuration of an ultrasonic microphone shown in FIG. 2.
Figure 4:
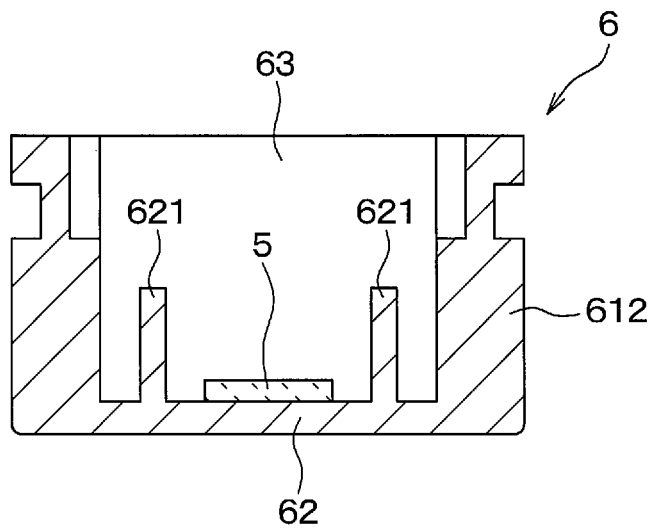
FIG. 4 is a cross-sectional view showing a cross-section sectioned along line IV-IV shown in FIG. 3.

Next, a configuration of an ultrasonic sensor 1 will be described with reference to FIGS. 2 to 4.

Figure 2:
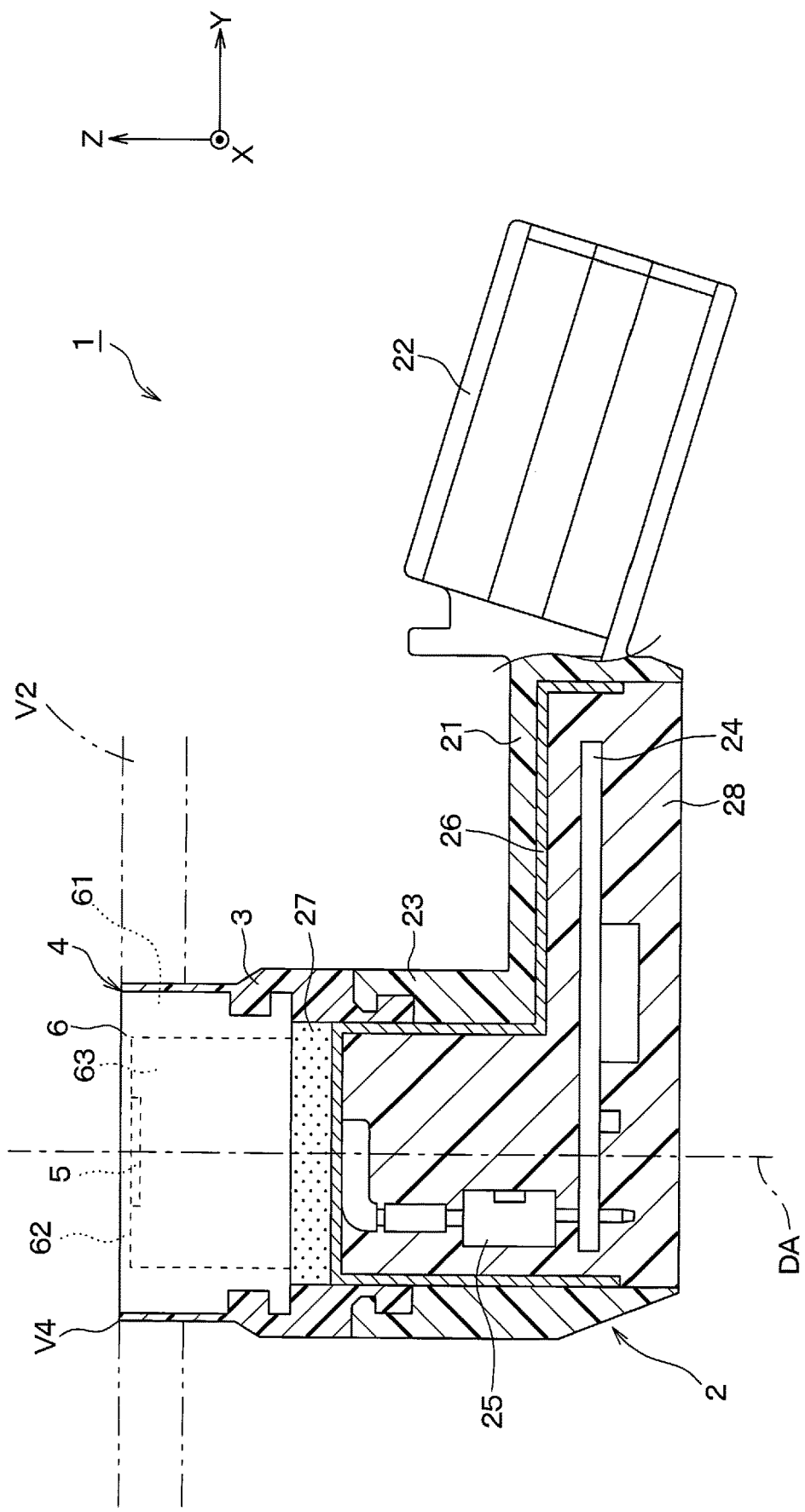
FIG. 2 is a cross-sectional view of an overall configuration of an ultrasonic sensor.

Hereinafter, for convenience of explanation, as shown in FIG. 2, an XYZ orthogonal coordinate system is set such that Z axis is parallel to a directional center axis DA of the ultrasonic sensor 1. A direction parallel to the directional center axis DA is referred to as axis direction. Note that an upper side part in FIG. 2, that is, Z axis positive direction side is sometimes referred to as a tip end side in the axial direction. Similarly, a lower side part in FIG. 2, that is, Z axis negative side is sometimes referred to as a base end side. Further, any directions orthogonal to the axial direction are sometimes referred to as an in-plane direction. In other words, the in-plane direction is a direction parallel to the XY plane shown in FIG. 2. Also, in FIG. 3, the XYZ coordinate system is indicated corresponding to XYZ orthogonal coordinate system shown in FIG. 2.

The ultrasonic sensor 1 is provided with a sensor case 2, an elastic supporting member 3 and an ultrasonic microphone 4. The ultrasonic microphone 4 is provided with an ultrasonic element 5 and an element accommodating case 6. Hereinafter, each constituent of the ultrasonic sensor 1 will be described.

As shown in FIG. 2, the sensor case 2 serves as a housing of the ultrasonic sensor 1 and supports the elastic supporting member 3. The sensor case 2 is composed of a case body 21, a connection unit 22 and a case cylindrical portion 23. The sensor case 2 is formed such that these portions are integrated by hard synthetic resin such as polypropylene.

The case body 21 is a box part having an outlined shape of a substantially rectangular parallelepiped, and formed in a bottomed cylindrical shape in which the base end side in the axial direction is opened.

The connector unit 22 is extended towards outside from a side wall portion of the case body 21 so as to connect the ultrasonic sensor 1 with an external equipment such as electro control unit.

The case cylindrical portion 23 is formed having a substantially cylindrical shape and projected from the case body 21 towards a tip end side in the axial direction. The case cylindrical portion 23 is configured so as to support a base end portion of the elastic supporting member 3 with respect to the axial direction, where the elastic supporting member 3 is formed in a substantially cylindrical shape of which the axial center is the directional center axis DA. A cylindrical shaped space inside the case cylindrical portion 23 is provided to communicate with a substantially rectangular parallelepiped space inside the case body 21. Hereinafter, the space inside the case cylindrical portion 23 and a space inside the case body 21 are collectively referred to as inside space of sensor case 2.

In the inside space of sensor case 2, a circuit board 24, a wiring unit 25 and a shielding unit 26 are accommodated. The circuit board 24 that controls an operation of the ultrasonic sensor 1 is accommodated in the case body 21. The wiring unit 25 is provided to connect the ultrasonic microphone 4 and the circuit board 24. The shielding unit 26 is fixed to the inner surface of the sensor case 2, covering the circuit board 24 and the wiring portion 25 to be electromagnetically shielded.

A damper member 27 is a disc-shaped member having an outer diameter which corresponds to the inner diameter of the elastic supporting member. Specifically, the damper member 27 is embedded in a cylindrical space inside the elastic supporting member 3 at a portion closer to the base end side than a portion of the ultrasonic microphone 4 in the axial direction. The damper member 27 is provided so as to suppress propagation of vibration from the ultrasonic microphone 4 to the sensor case 2. Specifically, the damper member 27 is formed by, for example, a foamed elastic member such as a foamed silicone having insulation and elastic properties.

A filling material 28 is filled in the inside space of the sensor case 2. The filling material 28 is formed by a synthetic resin material such as a silicone rubber having insulation and elastic properties.

The elastic supporting member 3 is formed by a synthetic resin-based elastic material such as silicone rubber having insulation and elastic properties. The synthetic resin-based elastic material is also referred to as a viscoelastic material or an elastomer. The elastic supporting member 3 is configured to elastically support the ultrasonic microphone 4 by covering the base end side of the ultrasonic microphone 4 in the axial direction while exposing the tip end side thereof.

The ultrasonic microphone 4 is configured of the ultrasonic element 5 and the element accommodating case 6 and functions as an ultrasonic transmitter-receiver. That is, the ultrasonic microphone 4 is configured to be capable of transmitting and receiving the ultrasonic waves.

In other words, the ultrasonic microphone 4 is configured to transmit probing waves along the directional center axis DA based on the applied drive signal. The directional center axis DA is a virtual half straight line extending in the transmission-reception direction of the ultrasonic waves from the ultrasonic microphone 4, and serves as a reference of the directional angle. The directional center axis is also referred to as a detection axis. Further, the ultrasonic microphone 4 is configured to receive reflection waves reflected at an object existing therearound and generates a reception signal.

The ultrasonic element 5 is configured to convert between electrical signal and ultrasonic vibration. The ultrasonic element 5 is, for example, a piezoelectric element and formed in a thin film having a thickness direction in the axial direction. For example, as shown in FIG. 3, the ultrasonic element 5 is attached to an inner side surface of a bottom plate portion 62 (described later) in the element accommodating case 6 having a bottomed cylindrical shape. Note that the inner side surface of the bottom plate portion 62 refers to a surface surrounded by a side plate portion 61 (described later).

The element accommodating case 6 is formed in a bottomed cylindrical shape of which the axial center is the directional center axis DA, and provided with an inner space 63 capable of accommodating the ultrasonic element 5 thereinside. The element accommodating case 6 is provided with a side plate portion 61 and a bottom plate portion 62, and these portions are formed by the same material. The element accommodation case 6 is integrally formed without any joints by a metal such as aluminum. The element accommodating case 6 can be formed with any methods such as cutting, electric discharging machining, and casting, for example.

For example, the side plate portion 61 is formed in a cylindrical shape that surrounds the directional center axis DA, that is, a cylindrical shape having the center axis line substantially parallel to the directional center axis DA. The side plate portion 61 includes a thin wall portion 611 and a thick wall portion 612.

The thin wall portion 611 is formed in a partially cylindrical shape having a predetermined thickness in a radial direction orthogonal to the directional center axis DA. The radial direction refers to a direction radially extending from the directional center axis DA. That is, in the case where a virtual circuit is drawn on a plane of which the normal line is the directional center axis DA, the center of the virtual circuit being a cross point between the plane and the directional center axis, the radial direction is defined as radius direction of the virtual circle. Further, a dimension in the radius direction of respective portions is sometimes referred to as a thickness. In other words, the thin wall portion 611 has a predetermined thickness smaller than that of the thick wall portion 612.

The predetermined thickness of the thin wall portion 611 has a thickness which is the closest dimension to the thickness of the bottom plate portion 62 in the axial direction among dimensions of the side plate portion 61 and the bottom plate portion 62 in the radial direction or the axial direction. Specifically, the thin wall portion 611 is formed to have thickness which is 0.3 to 2.0 times of the dimension of the bottom plate portion 62 in the axial direction, preferably the thickness is 0.5 to 1.5 times of the bottom plate portion 62 in the axial direction, and more preferably, the thickness is 0.7 to 1.2 times of the bottom plate portion 62 in the axial direction. Typically, the thin wall portion 611 may be formed to have the thickness substantially the same as that of the bottom plate portion 62.

The thick wall portion 612 has a thickness (i.e. dimension in radius direction) larger than that of the thin wall portion 611. Specifically, according to the present embodiment, the thick wall portion 612 is formed in an arcuate shape surrounded by chord and arc extended in the X direction when viewing along a visual line parallel to the directional center axis DA. Also, the thick wall portion 612 is provided adjacently to the thin wall portion 611 in a circumferential direction surrounding the directional center axis DA.

According to the present embodiment, a pair of thin wall portions 611 are arranged facing each other with respect to the directional center axis DA. Similarly, a pair of thick wall portions are arranged facing each other with respect to the direction center axis DA. According to the present embodiment, the inner space 63 is formed in a rounded rectangular shape constituted of a pair of semicircles or an elliptical shape when viewing along a visual line parallel to the directional center axis DA. Further, the side plate portion 61 includes a pair of thin wall portions 611 provided corresponding to the semicircles and a pair of thick wall portions 612 provided corresponding to a line segment. Thus, the ultrasonic microphone 4 is configured to have narrower directional angle in the Y axis compared to that in the X axis. Note that since the thick wall portion 612 can be designed as a portion for adjusting the directivity of the ultrasonic waves, the thick wall portion 612 can be referred to as directivity adjusting portion.

The bottom plate portion 62 is a portion formed in a flat plate shape or a thin plate shape having a thickness direction in the axial direction, and provided to close one end side of the side plate portion 61 in the axial direction. Specifically, the bottom plate portion 62 is integrally coupled with a tip end portion of the side plate portion 61 in the axial direction without any joints. As shown in FIG. 3, by attaching the ultrasonic element 5, the bottom plate portion 62 is configured to vibrate as an ultrasonic vibration in the axial direction while an outer periphery portion coupled to the side plate portion 61 is deflected as a fixed end, in response to a transmission or reception of the ultrasonic waves by the ultrasonic element 5. According to the present disclosure, two protrusions 621 are provided on an inner side surface of the bottom plate portion 62, that is, a surface in the inner space 63 side where the ultrasonic element 5 is accommodated.

The protrusions 621 are each configured as a rod body protruding along the direction center axis DA from the inner side surface of the bottom plate portion 62, for example, configured as a cylindrical shape. The protrusions 621 are configured to vibrate as an ultrasonic vibration together with the bottom plate portion 62 in response to a transmission or reception of the ultrasonic waves by the ultrasonic element 5. The protrusions 621 generate a plurality of vibration modes. According to the present embodiment, as shown in FIG. 3, two protrusions 621 are formed between the ultrasonic element 5 and the side plate portion 61 in the inner side surface of the bottom plate portion 62.

Specifically, two protrusions 621 are arranged at portions with a distance from the side plate portion 61 and the ultrasonic element 5 and are positioned at both sides of the ultrasonic element 5. The two protrusions 621 may preferably be arranged symmetrically with respect to the ultrasonic element 5 as the center thereof when considering directivity control of the ultrasonic waves. However, it is not limited thereto. Moreover, the two protrusions 621 are arranged at portions where a loop or node of the vibration is formed in the protrusions 621 during vibration when the bottom plate portion 62 vibrates as an ultrasonic vibration. Thus, two protrusions 621 vibrate as a tuning fork when the bottom plate portion 62 vibrates as an ultrasonic vibration, and the vibration is propagated to the bottom plate portion 62, thereby producing two vibration modes which will be described later and a plurality of resonance frequencies.

Note that loop of vibration refers to, in a state where a standing wave occurs in the bottom plate portion 62 due to the ultrasonic vibration, a part of the bottom plate portion 62 having the largest shake-movement of the standing wave. Also, the node of vibration refers to, in a state where the standing wave occurs in the bottom plate portion 62 due to the ultrasonic vibration, a part of the bottom plate portion 62 at which the standing wave appears not to move.

For the two protrusions, the length of protrusion and the width dimension are appropriately changed depending on the dimension and material of the element accommodating case 6. These lengths of protrusion and the width dimension may be calculated with a simulation or the like.

The basic configuration of the ultrasonic sensor 1 according to the present embodiment is described so far.

(Effects and Advantages)

Next, effects and advantages of the ultrasonic sensor 1 will be described with reference to FIG. 5.

According to the ultrasonic sensor 1 configured described above, the ultrasonic element 5 vibrates as an ultrasonic vibration in response to an input of the electrical signal from the wiring (not shown). When the ultrasonic element 5 vibrates as an ultrasonic vibration, the element accommodating case 6 is excited due to the vibration thereof. Thus, the ultrasonic microphone 4 constituted of the ultrasonic element 5 and the element accommodating case 6 vibrates at a predetermined vibration mode.

Further, according to the above-described configuration, for the bottom plate portion 62, the ultrasonic element 5 is attached to the bottom plate portion 62 and the two protrusions 621 are symmetrically arranged with respect to the ultrasonic element 5 as the center thereof. Then, the two protrusions 621 vibrates as an ultrasonic vibration together with the bottom plate portion 62 when driving the ultrasonic element 5.

A computer simulation is applied to a vibration state of the ultrasonic microphone 4 configured as described above. As a result, acoustic impedance characteristics shown in FIG. 5 are obtained. In the ultrasonic microphone 4, two significant structural resonant frequencies occur in a frequency range from 40 kHz to 70 kHz. Specifically, the ultrasonic microphone 4 is configured such that the structured resonant frequencies at about 47 kHz and 67 kHz are present. That is, the result shown in FIG. 5 indicates that the ultrasonic microphone 4 has a plurality of resonant frequencies by providing the protrusions on the bottom plate portion 62. Note that the first structural resonant frequency and the second resonant frequency have a relationship in which one of the first structural resonant frequency and the second resonant frequency does not have high-order frequency of the other.

Figure 5:
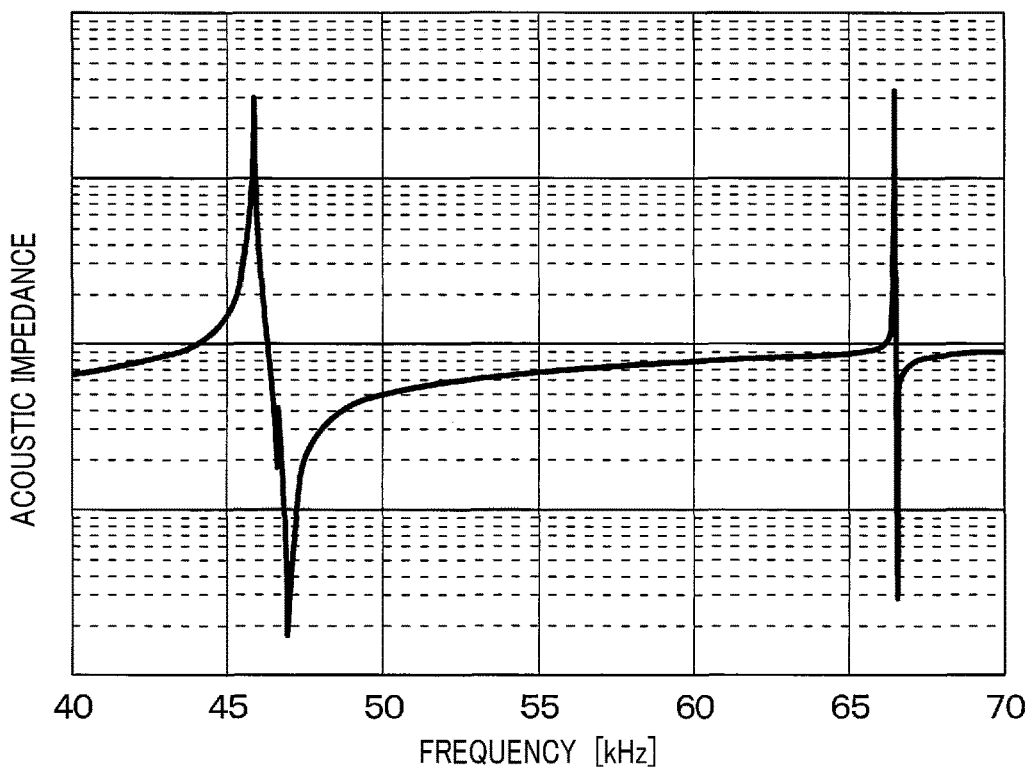
FIG. 5 is a graph showing acoustic impedance characteristics of the ultrasonic microphone shown in FIG. 3.
Figure 6:
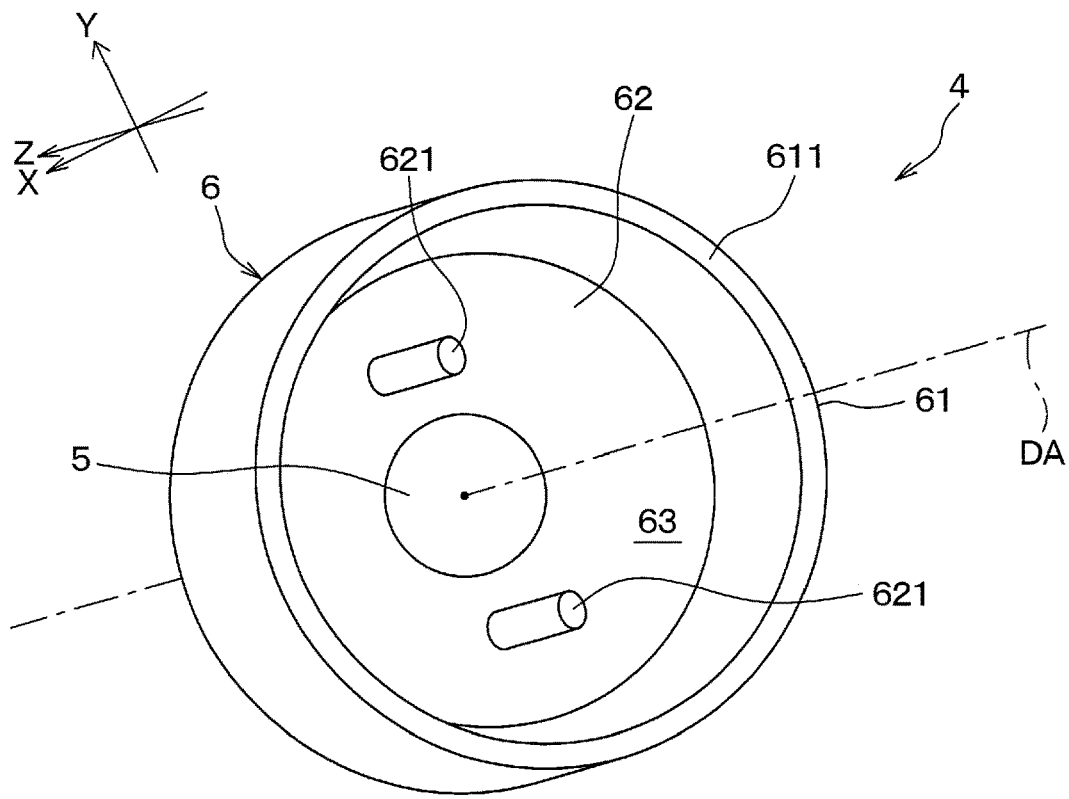
FIG. 6 is a perspective view showing an overall configuration of an ultrasonic microphone according to a first modification.

The two structural resonant frequencies shown in FIG. 5 are produced due to two vibration modes occurring at the element accommodating case 6. Specifically, the first vibration mode occurs when the ultrasonic waves propagate to the side plate portion 61 from the bottom plate portion 62. The second vibration mode occurs when the ultrasonic waves propagate to the protrusion 621 from the bottom plate portion 62. The structural resonant frequency at 47 kHz corresponds to the above-described first vibration mode. For the structural resonant frequency at about 67 kHz, it is estimated that vibration waves due to the above-described first vibration mode and the vibration waves due to the second vibration mode are synthesized.

More specifically, the thickness of the bottom plate portion 62 through which the ultrasonic waves are propagated becomes thicker (changes) only at a portion where the protrusion 621 is formed, whereby the impedance of the ultrasonic propagation in the bottom plate portion 62 partially changes. Moreover, the ultrasonic vibration is reflected at the two protrusions 621 which are impedance mismatch points, thereby causing resonance, that is the second vibration mode. Hence, it is estimated that the first vibration mode and the second vibration mode in the bottom plate portion 62 are synthesized to cause the second vibration mode.

For the simulation shown in FIG. 5, simulation is applied to a configuration in which two protrusions 621 are added to the ultrasonic microphone 4 having the structural resonant frequency of about 45 kHz when the protrusions 621 are not provided in the bottom plate portion 62. The above-described simulation result is obtained in the case where the diameter of the bottom plate portion 62 is d (unit: mm), two protrusions 621 are symmetrically arranged with respect to the ultrasonic element 5 as the center thereof, and the interval thereof is d×⅔.

According to the present embodiment, a single ultrasonic microphone 4 is capable of having a plurality of structural resonant frequencies by simply changing the shape thereof in which the protrusions 621 are provided in the inner side surface of the bottom plate portion 62. Further, effects of suppressing a degradation of the durability and an increase in the cost can be obtained compared to a conventional structure in which two bottomed cylindrical cases having large and small sizes are attached. Accordingly, a single ultrasonic sensor 1 is configured to have a plurality of resonant frequencies while securing the durability thereof.

(First Modification)

In the ultrasonic sensor 1, the element accommodating case 6 may be configured such that the side plate portion 611 is formed by only the thin wall portion 611. Even with this structure, the protrusions 621 are formed on the bottom plate portion 62 which is the propagation path of the ultrasonic vibration to cause a change point for the impedance of the vibration. Hence, the effect of a structure having a plurality of resonant frequencies can be obtained.

(Second Modification)

Figure 7:
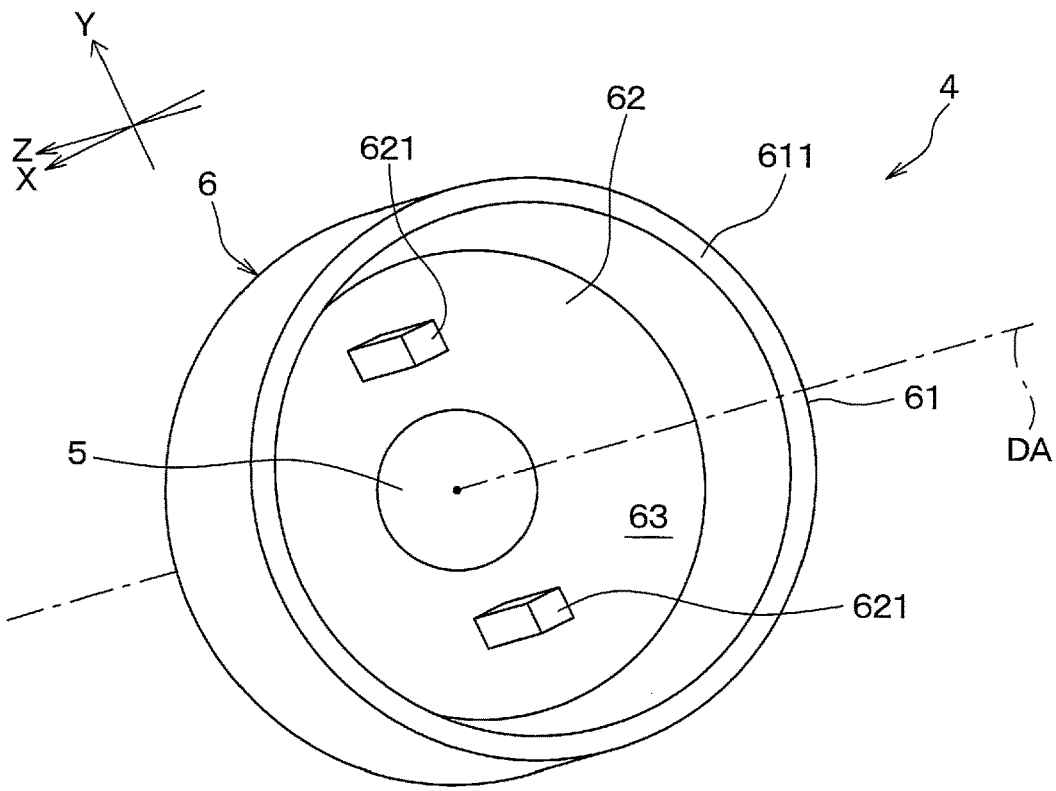
FIG. 7 is a perspective view showing an example of an overall configuration of an ultrasonic microphone according to a second modification.
Figure 8:
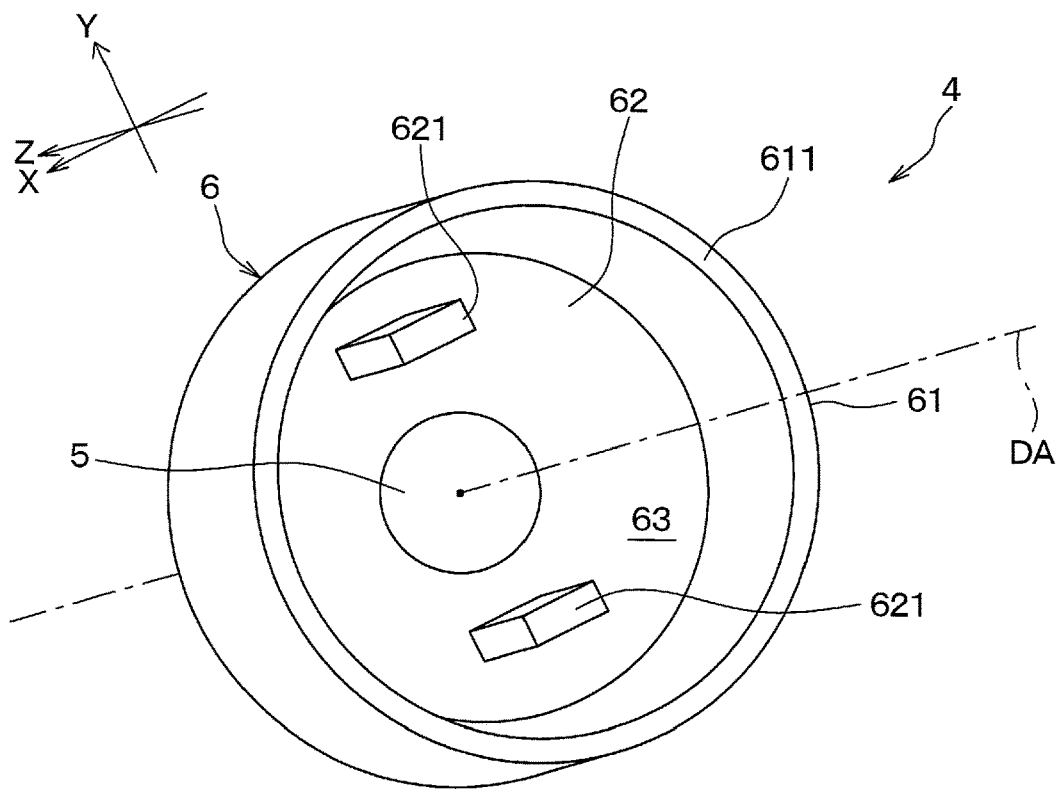
FIG. 8 is a perspective view showing another example of an overall configuration of the ultrasonic microphone according to the second modification.

In the ultrasonic sensor 1, the protrusions 621 are not limited to a cylindrical shape when being formed in a rod shape, but may be a shape different from the cylindrical shape. For example, the protrusions are formed in a right quadrangular prism as shown in FIG. 7. Further, the protrusions 621 may be configured as not only the rod shape but a plate shape such as rectangular square columnar shape.

Further, the protrusions 621 may be formed in a polygonal columnar shape or an elliptic cylinder shape, and thus the shape of the protrusions 621 can be appropriately changed. According to the present modification example, since a changing point for the impedance of the vibration is produced in the bottom plate portion 62, a single ultrasonic sensor 1 having a plurality of resonant frequencies is provided.

(Third Modification)

Figure 9:
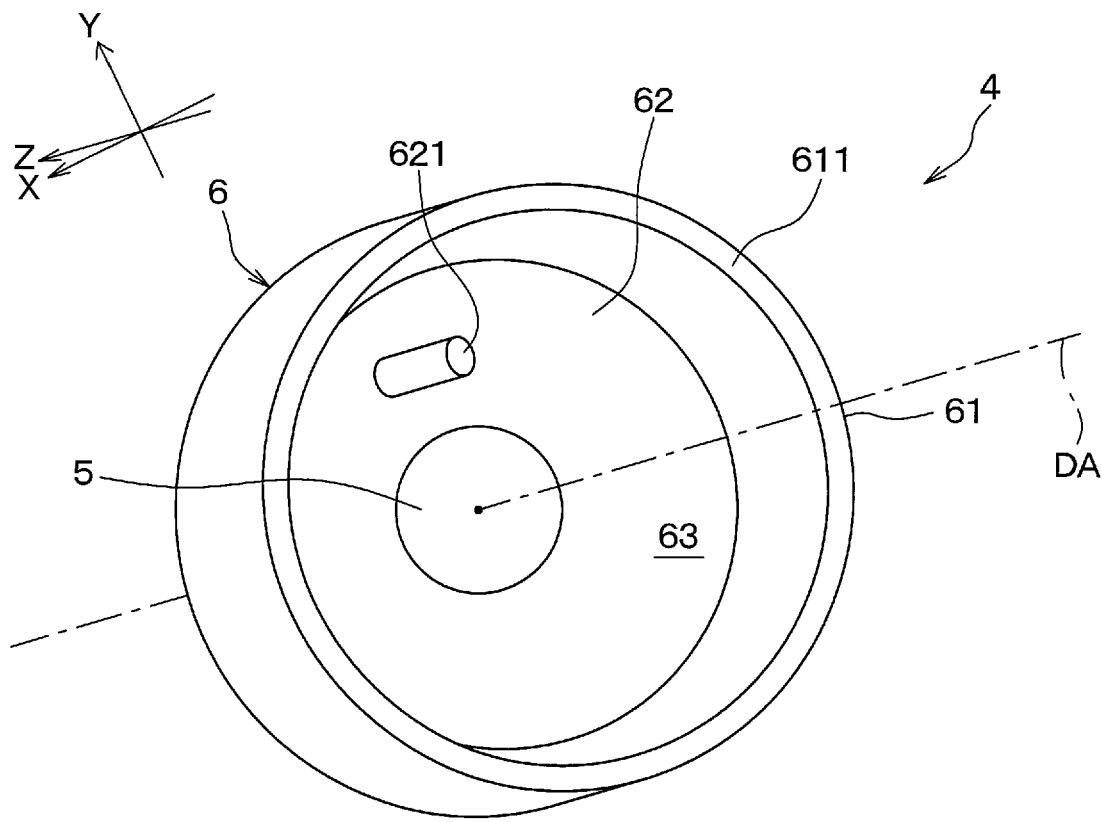
FIG. 9 is a perspective view showing an overall configuration of an ultrasonic microphone according to a third modification.
Figure 10:
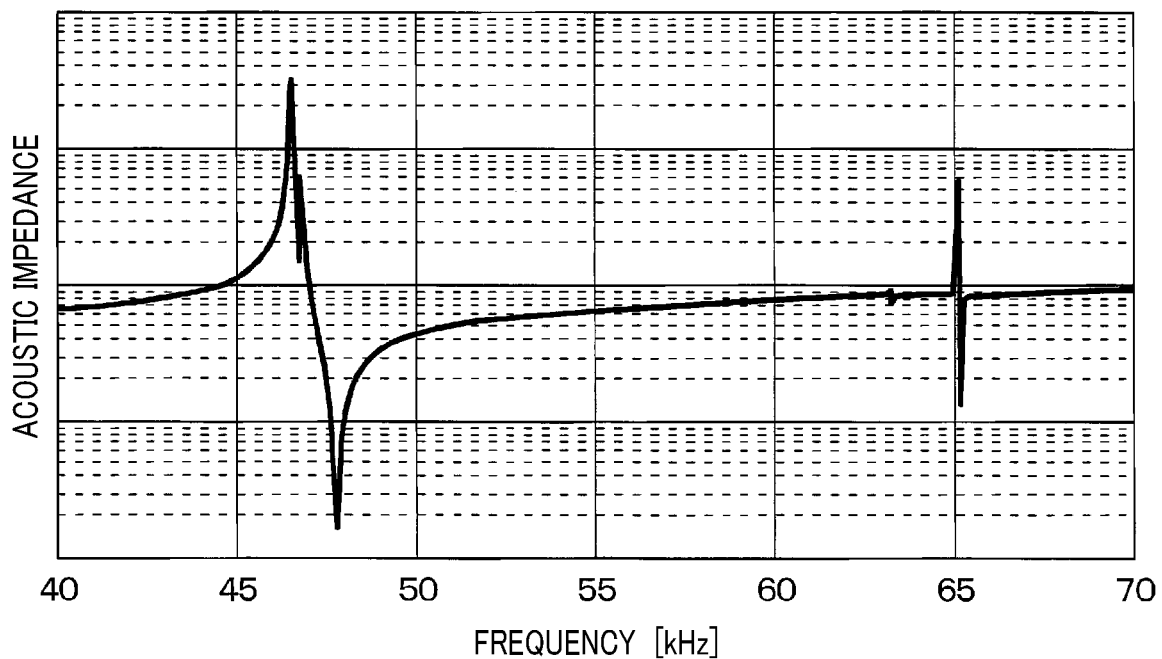
FIG. 10 is a graph showing acoustic impedance characteristics of the ultrasonic microphone shown in FIG. 9.

As shown in FIG. 9, for example, the ultrasonic sensor 1 may be configured such that the bottom plate portion 62 has only a single protrusion 621. As a result of simulation for the vibration state of the ultrasonic microphone 4, the acoustic impedance characteristics shown in FIG. 10 is obtained. In the ultrasonic microphone 4, two significant structural resonant frequencies occur at about 47 kHz and about 65 kHz in a range from 40 kHz to 70 kHz. According to the present modification, since the vibration impedance in the bottom plate portion 62 partially changes due to the protrusions 621, a single ultrasonic sensor 1 having two resonant frequencies is provided.

Second Embodiment

With reference to FIGS. 11 to 14, an ultrasonic sensor according to a second embodiment will be described.

Figure 11:
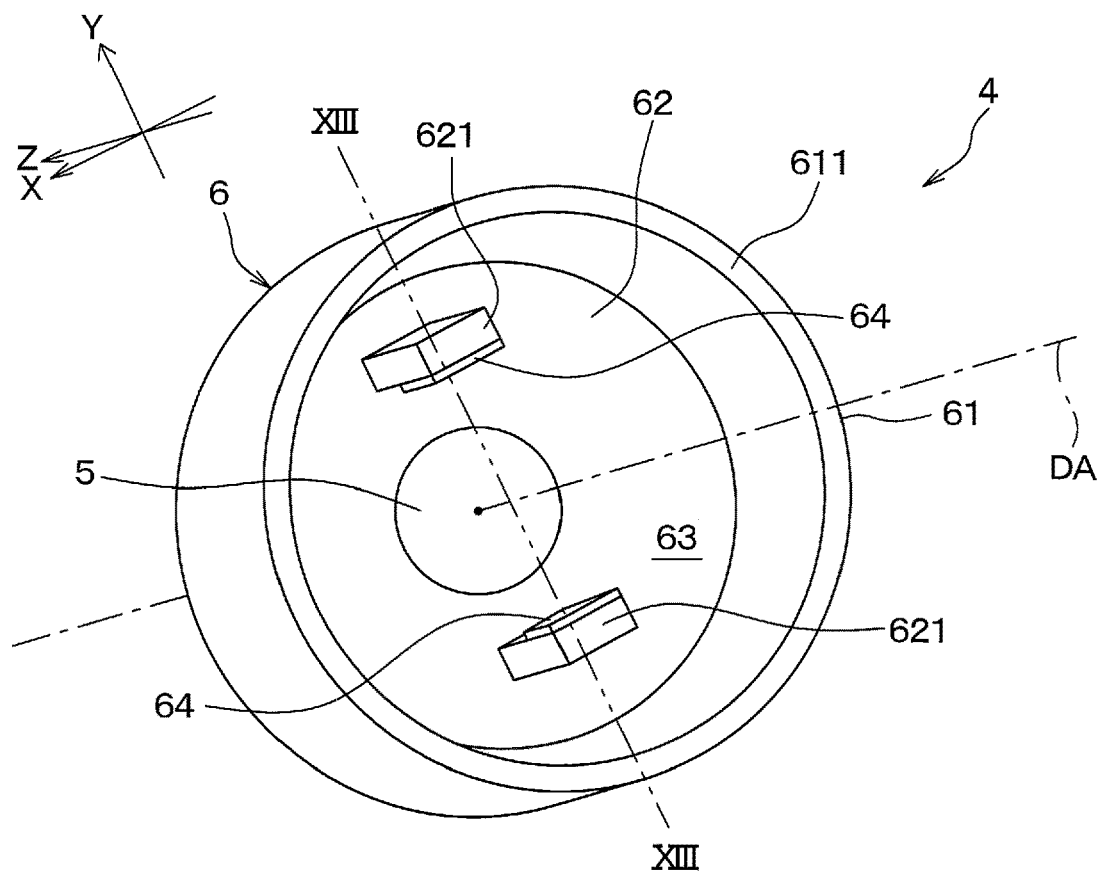
FIG. 11 is a perspective view showing an overall configuration of an ultrasonic microphone in an ultrasonic sensor according to a second embodiment.

According to the present embodiment, as shown in FIG. 11, the ultrasonic microphone 4 differs from the above-described first embodiment in that a vibration attenuation unit 64 is attached to the protrusions 621 in the element accommodating case 6.

Note that a case will be described as a typical example with two protrusions 621 having a rectangular plate shape. However, the present disclosure is not limited thereto. As described in the first embodiment, the number of protrusions 621, the shape and arrangement thereof can be appropriately changed. Further, similar to the first embodiment, the element accommodating case 6 may be configured to have the thin wall portion 611 and a thick wall portion 612, and is not limited to the configuration of the typical example.

The vibration attenuation unit 64 is a member that attenuates, after transmitting ultrasonic waves externally from the ultrasonic element 5, unintentional vibration (hereinafter referred to as reverberation vibration) occurred at the protrusion 621 due to the ultrasonic transmission, in order to receive reflected waves earlier.

Specifically, as a result of keen research of the inventors of the present disclosure, it is discovered that unintentional reverberation vibration possibly occurs in the ultrasonic microphone 4 having the protrusions 621 when externally transmitting ultrasonic ways. In the case where reverberation vibration occurs at the protrusions 621, reception of the reflected waves of the ultrasonic waves transmitted externally is disturbed until the reverberation vibration converges, thereby causing degradation of the performance of the ultrasonic sensor. The vibration attenuation unit 64 attenuates the vibration energy due to this reverberation vibration by cancelling or absorbing it, thereby converging the reverberation vibration earlier.

The vibration attenuation unit 64 is configured as a known element or an electronic component such as piezoelectric element, thermistor and resistor and attached to the protrusions 621 by an adhesive or the like which is not shown. The vibration attenuation unit 64 cancels or absorbs the vibration energy.

For example, in the case where the vibration attenuation unit 64 is a piezoelectric element, when a reverberation vibration occurs, the protrusions 621 are caused to vibrate as a so-called reverse-phase vibration in a direction with which the reverberation vibration of the protrusions 621 are cancelled. In this case, the vibration attenuation unit 64 is connected to the control unit 7 arranged outside the ultrasonic microphone 4 via a wiring which is not shown, and vibrates based on the control signal from the control unit 7.

The control unit 7 is an electronic control unit including CPU, ROM, RAM mounted on a circuit board thereof (not shown), which is an ECU (Electronic Control Unit). The control unit 7 performs a drive control of the vibration attenuation unit 64 depending on a state of the ultrasonic microphone 4.

For example, in the case where the ultrasonic microphone 4 externally transmits the ultrasonic waves, the control unit 7 controls the vibration attenuation unit 64 to vibrate such that the protrusions 621 vibrate in a direction same as the vibration direction of the protrusions 621 due to the ultrasonic waves, that is, the protrusions 621 vibrate not to cancel the ultrasonic waves. In other words, in the case where the ultrasonic waves are externally transmitted, the control unit 7 executes a control in which the vibration attenuation unit 64 vibrates in the same direction as the vibration direction of the protrusions 621 of the vibration attenuation unit 64, that is, the vibration attenuation unit 64 vibrates in the same phase.

On the other hand, after the ultrasonic microphone 4 externally transmits the ultrasonic waves and until the reflected waves are received, the control unit 7 executes a vibration control of reverse-phase vibration in which the vibration attenuation unit 64 is caused to vibrate in a direction to cancel the reverberation vibration occurring in the protrusions 621.

Thus, in the case where the ultrasonic waves are externally transmitted, the vibration attenuation unit 64 causes the protrusions 621 to vibrate in a direction opposite to the direction of the reverberation vibration, thereby cancelling the energy due to the reverberation vibration and converging the reverberation vibration earlier. According to the simulation, in the case where the reverberation vibration occurs in the protrusions 621 provided with the vibration attenuation unit 64 constituted by piezoelectric element, the maximum displacement of the protrusions 621 is 2.38 μm when the vibration attenuation unit 64 is not caused to vibrate and 1.68 μm when the vibration attenuation unit 64 is caused to vibrate. Thus, the vibration attenuation unit 64 vibrates with the reverse-phase, whereby the deviation in the vibration of the protrusions 621 is reduced by 30% and the reverberation vibration is converged earlier.

Figure 14:
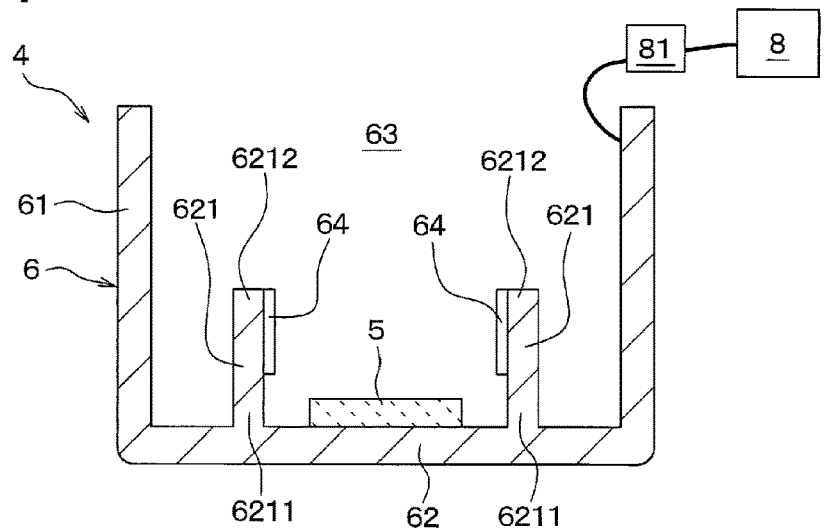
FIG. 14 is a diagram showing the cross-section of the ultrasonic microphone corresponding to the one shown in FIG. 13 and an external device and a switch connected to a vibration attenuation unit.

The vibration attenuation unit 64 when configured by a thermistor, if the reverberation vibration occurs on the protrusions 621, absorbs the vibration energy and converts this into electrical energy, thereby reducing the energy of the reverberation vibration and converging the reverberation vibration earlier. In this respect, for example, as shown in FIG. 14, the vibration attenuation unit 64 is configured to be connected to an external element 8 arranged outside the ultrasonic microphone 4 via a wiring (not shown), and make the external element 8 consume the electrical energy generated by absorbing the energy due to reverberation vibration. Also, in this case, a switch 81 may be disposed between the vibration attenuation unit 64 and the external element 8 in order to change the connection state therebetween.

For example, in the case where the vibration attenuation unit 64 is configured by a thermistor, when the ultrasonic waves are transmitted externally, also this vibration energy is converted into electrical energy in the vibration attenuation unit 64. At this moment, when the attenuation of the vibration energy is suppressed, since the transmission performance of the ultrasonic waves may be lowered, the switch 81 changes the connection state to be OFF such that no electrical energy is consumed by the external element 8.

Thus, when the ultrasonic waves are transmitted externally, attenuation of the vibration at the vibration attenuation unit 64 is suppressed so that the transmission performance of the ultrasonic waves can be prevented from being lowered.

On the other hand, after the ultrasonic microphone 4 externally transmits the ultrasonic waves, the switch 81 changes the connection to be ON to allow the external element 8 to consume the electrical energy produced at the vibration attenuation unit 64 due to the reverberation vibration. Thus, after externally transmitting ultrasonic waves, the vibration attenuation unit 64 attenuates the reverberation vibration, thereby converging the reverberation vibration earlier.

Note that the external element 8 may be any electronic component that is able to consume electrical energy. The switch 81 is connected to a control unit (not shown) and controlled to be ON and OFF depending on a driving state of the ultrasonic microphone 4. However, for the switch 81, a publicly known element or electronic component can be used as long as the switch is controlled to be ON and OFF.

Figure 13:
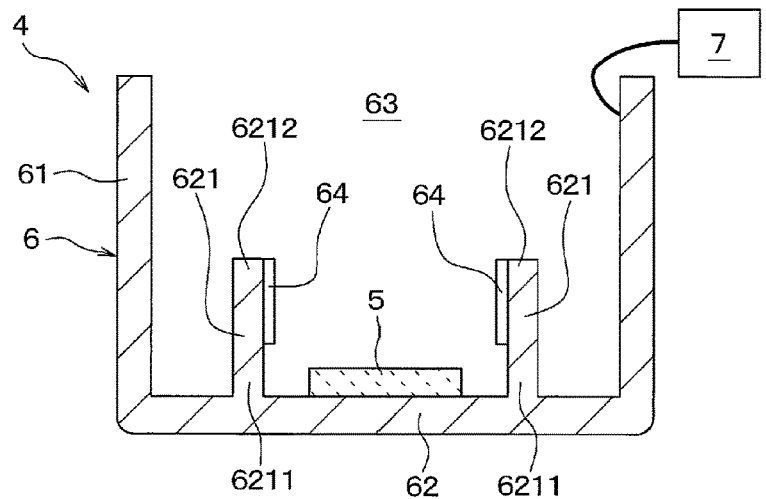
FIG. 13 is a diagram showing a cross-section of an ultrasonic microphone sectioned along a line XIII-XIII shown in FIG. 11 and a control unit connected to a vibration attenuation unit.

The vibration attenuation unit 64 is arranged, as shown in FIG. 13, at any positions between a root portion 6211 of the bottom plate portion 62 side and the tip end side 6212 in the protrusions 621. The vibration attenuation unit 64 is attached to a predetermined region in the protrusions 621 at least including a portion having the largest displacement due to the reverberation vibration, from the viewpoint of reduced reverberation vibration.

Figure 12:
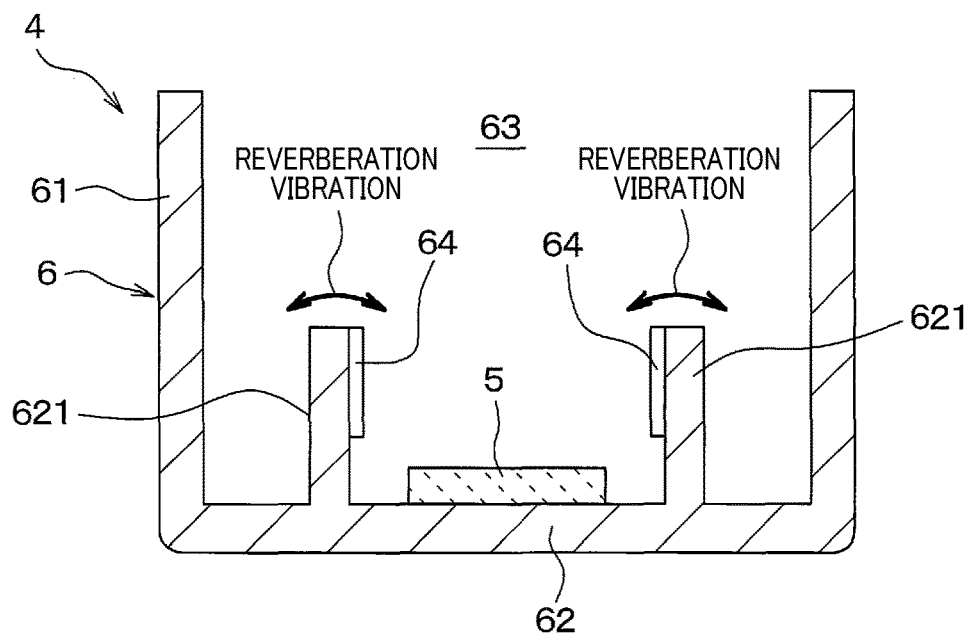
FIG. 12 is diagram explaining a displacement of a protrusion caused by reverberation vibrations.

Specifically, in the case where the protrusions 621 are each formed in a plate shape having a constant thickness as shown in FIG. 11, the tip portion 6212 of each protrusion 621 is a portion having the largest displacement due to the reverberation vibration. In such a case, as shown in FIG. 12, the vibration attenuation unit 64 is attached to a predetermined region in the protrusions 621 at least including the tip end portion 6212. This is similar to any shape applied to the protrusions 621 in which the thickness of the protrusions 612 becomes thinner from the root portion 6211 towards the tip end portion 6212, having the largest displacement at the tip end portions 6212.

Figure 15:
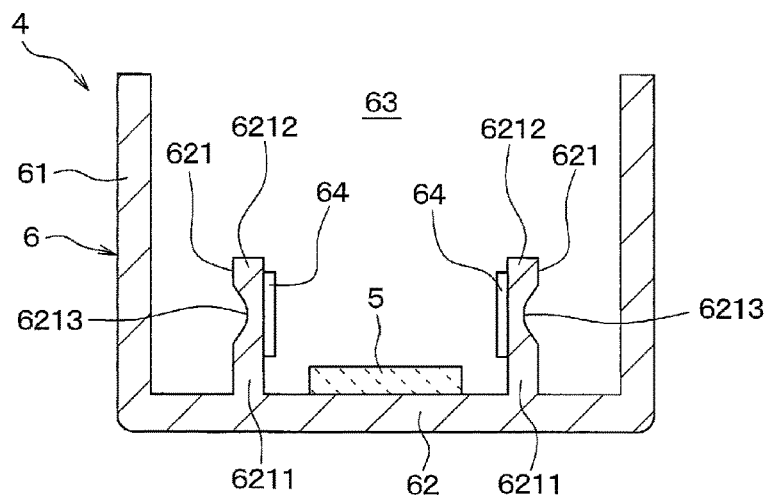
FIG. 15 is a diagram showing of the protrusion having another shape example and an arrangement example of the vibration attenuation unit corresponding to this protrusion, which corresponds to FIG. 13.

Further, as shown in FIG. 1, in the case where the protrusions 621 have constricted portions 6213 where the thickness becomes the smallest from the root portion 6211 to the tip end portion 6212, the protrusions 621 have the largest vibration displacement at the constricted portions 6213 during the reverberation vibration. In such a case, as shown in FIG. 15, the vibration attenuation unit 64 is attached to a predetermined region at least including the constricted portions 6213. Thus, the vibration attenuation unit 64 may preferably be arranged at a portion considering the vibration displacement of the protrusions 621 during the reverberation vibration.

Note that the vibration displacement of the protrusions 621 during the reverberation vibration is calculated with any simulation program such as ultrasonic analysis software. Further, the object to which the vibration attenuation unit 64 is attached may be appropriately determined depending on the vibration displacement during the reverberation vibration, such that the vibration attenuation unit 64 may be attached to all of protrusions 621 in the case where a plurality of protrusions 621 are formed, or may be attached to a part of the protrusions 621.

According to the present embodiment, in addition to the effects and advantages of the above-described first embodiment, effects and advantages can be obtained in which the reverberation vibration produced in the protrusions 621 is reduced by the vibration attenuation unit 64, thereby receiving the reflected waves earlier. According to the ultrasonic sensor of the present embodiment, in particular, a detection limit distance in the short-distance range is expected to be improved.

Third Embodiment

An ultrasonic sensor according to a third embodiment will be described with reference to FIG. 16. Note that FIG. 16 is a cross-sectional view corresponding to FIG. 12.

Figure 16:
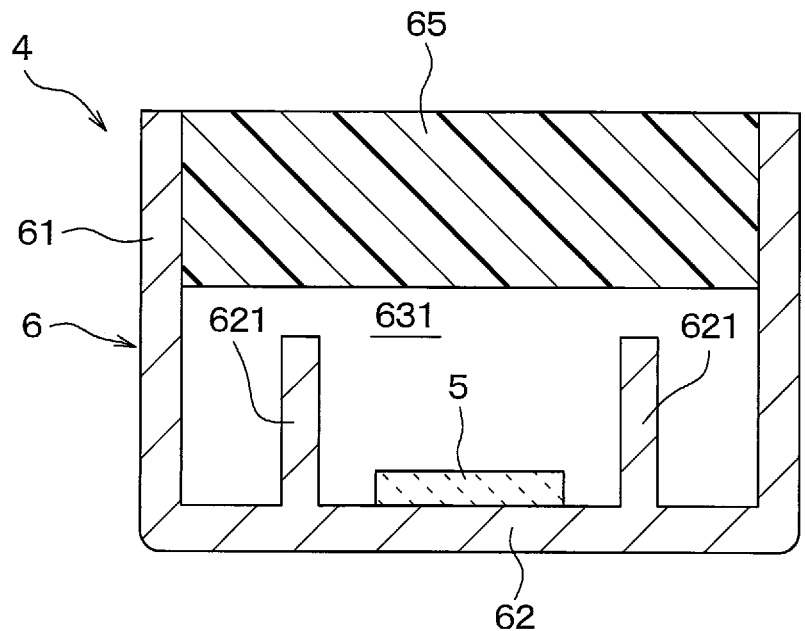
FIG. 16 is a diagram showing an overall configuration of an ultrasonic microphone in an ultrasonic sensor according to a third embodiment, which corresponds to FIG. 13.

As shown in FIG. 16, the ultrasonic sensor according to the present embodiment differs from the above-described first embodiment in that a protection member 65 is provided to close an opening portion in an opposite side of the bottom plate portion 62 in the element accommodating case 6. According to the present embodiment, this different portion will be mainly described.

As shown in FIG. 16, the protection member 65 closes another end side opposite to a side closed by the bottom plate portion 62 in the side plate portion 61, and protects a circuit (not shown) connected to the ultrasonic element 5 from outside air. The protection member 65 is made of silicone resin, for example. Further, the protection member 65 is arranged with a distance from the protrusions 621 such that the protection member 65 does not touch the protrusions 621 in order not to prevent the protrusions 621 from vibrating when receiving the reflected waves. As a result, according to the present embodiment, a closed space 631 is formed in the ultrasonic microphone 4, where a circuit (not shown) in the element accommodating case 6 is not exposed to moisture in the outside air. Thus, the configuration accomplishes circuit protection in the ultrasonic microphone 4 and maintains vibration characteristics of the protrusions 621.

Figure 17:
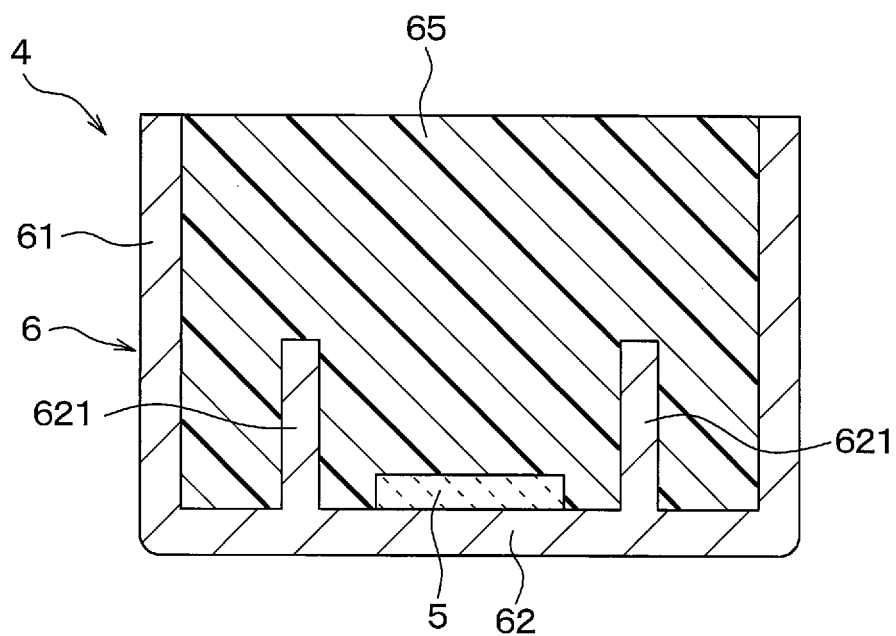
FIG. 17 is a cross-sectional view showing a comparative example in which a protection member touches a protrusion.

Specifically, for example, as shown in FIG. 17, a case will be assumed in which an ultrasonic sensor is arranged such that the protection member 65 fills the inner space 63 of the element accommodating case 6. Even in this case, since the inner space 63 of the element accommodating case 6 is covered by the protection member 65, the circuit which is not shown can be protected from outside air.

However, according to this structure, since the protrusions 621 touches the protection member 65, the vibration of the protrusions 621 when receiving the reflected waves of the ultrasonic waves which are externally transmitted, is suppressed. Hence, the vibration characteristics of the protrusions 621 may be degraded.

In contrast, according to the present embodiment, the protection member 65 closes an end portion in the opposite side of the bottom plate portion 62 in the side plate portion 61, whereby the closed space 631 is formed in which a circuit (not shown) connected to the ultrasonic element 5 and arranged apart from the protrusions 621. Thus, the circuit which is not shown is protected from the outside air, and since the circuit does not touch the protrusions 621, the protrusions 621 when externally receiving the reflected waves of the ultrasonic waves are not prevented from vibrating, and vibration characteristics can be maintained.

For example, the protection member 65 is formed in the following processes. The protection member 65 is arranged such that the opening portion of the element accommodating case 6 having the ultrasonic element 5 and the unshown circuit is disposed in the vertical direction, silicone resin is injected into the inner space 63 from the bottom side to seal the opening portion with an insufficient amount for completely filling the inner space 63, and then cured.

According to the present embodiment, an ultrasonic sensor having effects and advantages in addition to the above-described effects and advantages of the first embodiment can be obtained, that is, both of a circuit protection in the ultrasonic microphone 4 and avoiding excessive vibration suppression of the protrusions 621 can be obtained.

Modification Example of Third Embodiment

Next, modification examples of the ultrasonic sensor according to the third embodiment will be described with reference to FIGS. 18 to 20C. In FIG. 19, in order to easily recognize an arrangement of the constituents, outlines of the ultrasonic element 5 and the protrusions 621 are indicated by dotted lines since the outlines thereof cannot be viewed in top view because the protection member 65 covers them.

Figure 18:
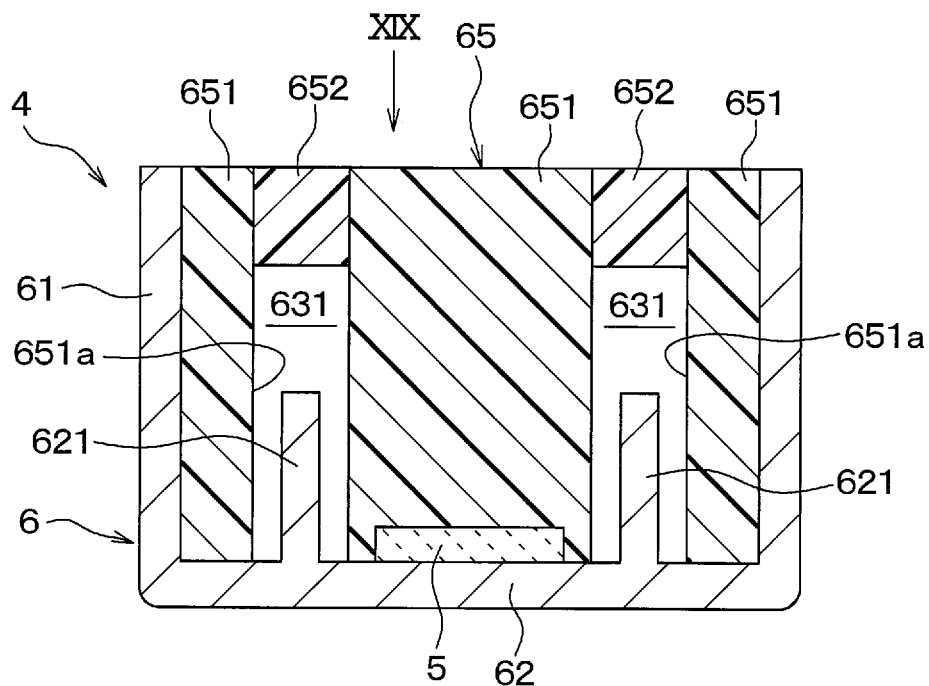
FIG. 18 is a diagram showing a configuration example of a protection member according to a modification example of the third embodiment, which corresponds to FIG. 13.
Figure 19:
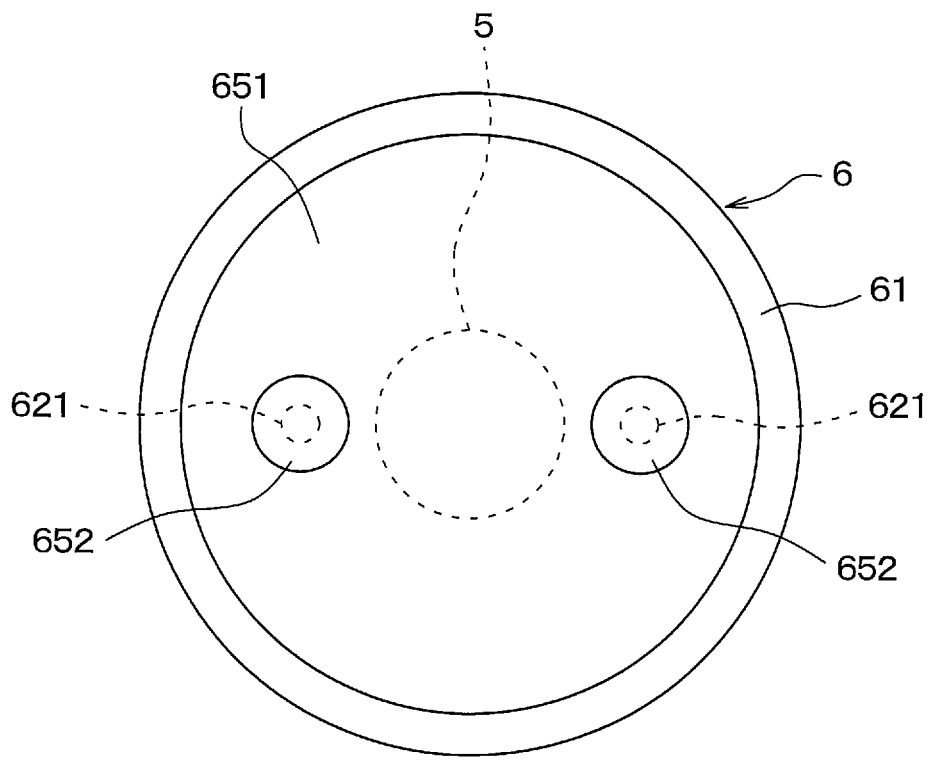
FIG. 19 is an arrow view of the ultrasonic microphone shown in FIG. 18 when viewed from an XIX direction.

Here, as shown in FIGS. 18 and 19, an ultrasonic microphone 4 having two cylindrical shaped protrusions 621 will be described as a typical example. However, it is not limited to this structure.

According to the present modification, as shown in FIG. 18, the protection member 65 is configured of a base portion 651 including as many thorough holes 651a as the protrusions 621 and a closing member 652 that closes an end portion side opposite to the bottom plate portion 62 in the through holes 651a of the base portion 651.

In the base portion 651, through holes 651a accommodating the protrusions 621 therein are formed. The base portion 651 fills a region excluding the protrusions 621 and a portion in the vicinity of the protrusions 621 in the inner space 63 of the element accommodating case 6. The through hole 651a may be formed in a columnar shape fitting with the outline of the protrusions 621. However, it is not limited thereto as long as the protrusions 621 do not touch the base portion 651. In top view, protrusions 621 are arranged in the vicinity of the center of the through holes 651a, and the base portion 651 is in a state not to contact the protrusions 621. The closing member 652 is arranged in an end portion opposite to the protrusions 621 in the through holes 651a.

The closing member 652 closes the end portion of the through holes 651a and forms the closed space 631 that accommodates the protrusions 621. The closing member 652 may be formed of silicone resin material similar to that of the base portion 651 or may be formed of a material different from that of the base portion 651, as long as the closing member 652 closes the end portion of the through holes 651a.

Figure 20A:
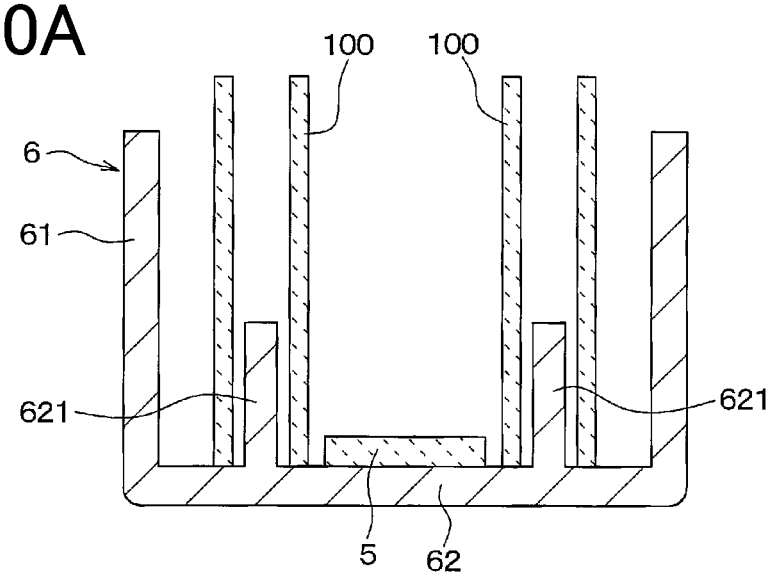
FIG. 20A is a diagram showing an arrangement process of a cylindrical member that surrounds the protrusion in a forming process of the protection member.
Figure 20B:
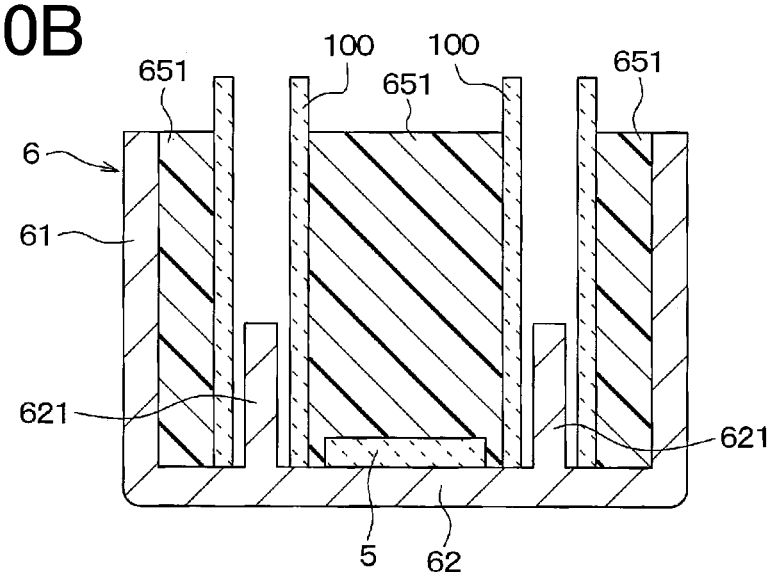
FIG. 20B is a diagram showing the forming process of the protection member subsequent to FIG. 20A.
Figure 20C:
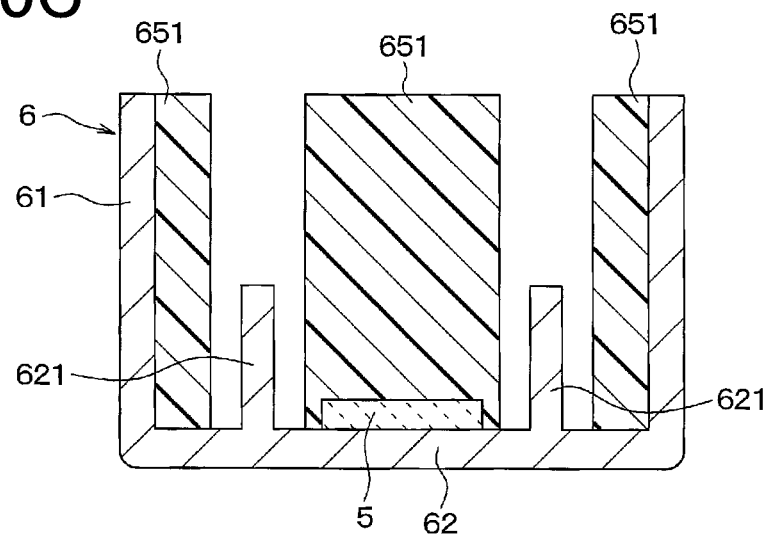
FIG. 20C is a diagram showing the forming process subsequent to FIG. 20B.

According to the present modification, the protection member 65 is formed through the processes shown in FIGS. 20A to 20C, for example. Firstly, as shown in FIG. 20A, a cylindrical member 100 surrounding the protrusions 621 is attached to the element accommodating case 6 which is provided with the protrusions 621 and the ultrasonic element 5. Subsequently, as shown in FIG. 20B, silicone resin material is filled into a portion outside the cylindrical member 100 and cured, thereby forming the base portion 651. Next, as shown in FIG. 20C, by removing the cylindrical member 100, the through holes 651a accommodating the protrusions 621 are formed. Thereafter, for example, the element accommodating case 6 is arranged such that the opening portion of the through hole 651a is disposed in the vertical direction, silicone resin is injected from bottom side with a predetermined amount for filling a part of the through hole 651a, and then cured, thereby forming the closing member 652. According to the present modification, the ultrasonic sensor in which similar effect to the above-described third embodiment is provided.

Fourth Embodiment

Figure 21:
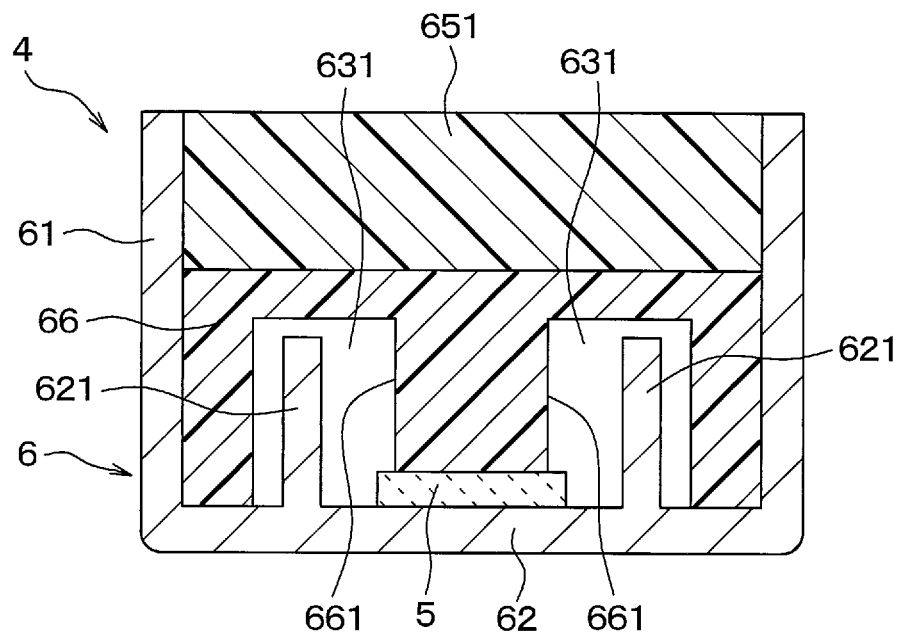
FIG. 21 is a diagram showing an overall configuration of an ultrasonic microphone in an ultrasonic sensor according to a fourth embodiment, which corresponds to FIG. 13.

An ultrasonic sensor according to a fourth embodiment will be described with reference to FIG. 21.

An ultrasonic sensor according to the present embodiment differs from the third embodiment in that a foam member 66 including a concave portion 661 between the protection member 65 and the protrusions 621 is provided in addition to the protection member 65. In the present embodiment, these different points will be mainly described.

he foam member 66 is provided with the concave portion 661 formed covering the protrusions 621, and is configured of, for example, a foamed elastic member such as a foamed silicone having insulation and elastic properties. The foamed member 66 has a height lower than that of the side plate portion 61 and has an outer diameter the same as the inner diameter of the side plate portion 61 so as to prevent the material of the protection member 65 which is later formed from flowing to the protrusions 621. In other words, the foam member 66 serves as an under coating for forming the protection member 65 while protecting the protrusions 621. Further, the foam member 66 has a function of suppressing vibration propagated from the ultrasonic microphone 4 to the sensor case 2 which is not shown in FIG. 21.

The concave portion 661 is formed to be at least larger than the outline of the protrusions 621, and has any shape in which the protrusions 621 and the foam member 66 do not contact with each other. The concave portion 661 is arranged to cover the protrusions 621 and forms the closed space 631 that accommodates the protrusions. The concave portion 661 is formed by any method such as cutting.

The ultrasonic sensor according to the present embodiment is produced by, for example, fitting the foam member 66 in which the concave portion 661 is formed, with the element accommodating case 6 so as to cover the protrusions 621 with the concave portion 661, filling the silicone resin material onto the foam member 66 and then curing them.

According to the present embodiment, in addition to the effects and advantages obtained from the above-described third embodiment, since the forming process of the protection member is simplified, an effect and an advantage of cost reduction in the manufacturing can be obtained.

Modification Example of Fourth Embodiment

Figure 22:
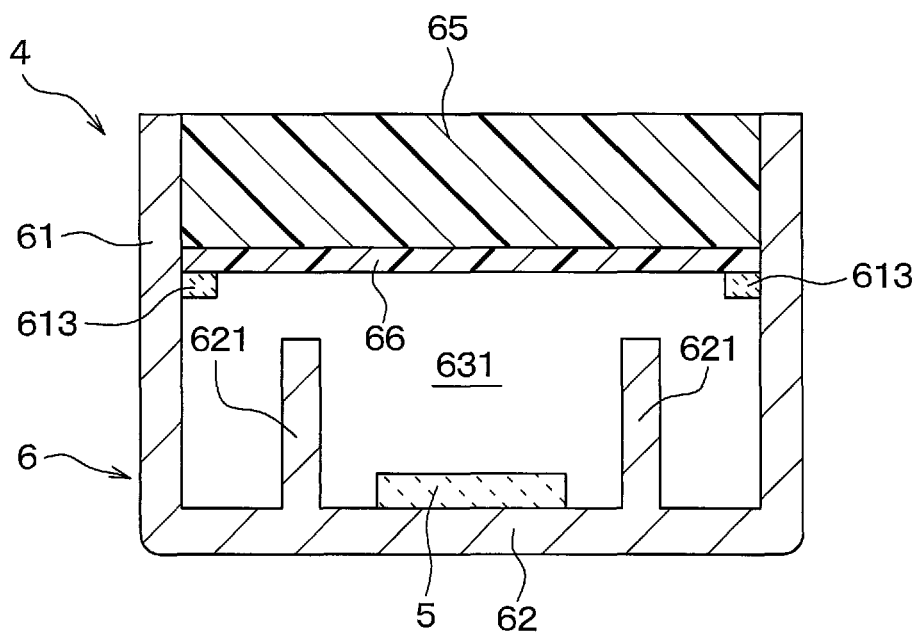
FIG. 22 is a cross-sectional view showing an overall configuration of an ultrasonic microphone according to a modification example of the fourth embodiment.

As shown in FIG. 22, the foam member 66 is configured as a plate-like member having no concave portion, and may be arranged on a convex portion formed at a portion in the side plate portion 61 which is higher than a height of a tip end portion of the protrusions 621 with respect to the bottom plate portion 62. The foam member 66 has an outer diameter the same as the inner diameter of the side plate portion 61, arranged being contact with the convex portion 613 and closes a predetermined region including the protrusions, thereby forming the closed space 631.

Figure 23A:
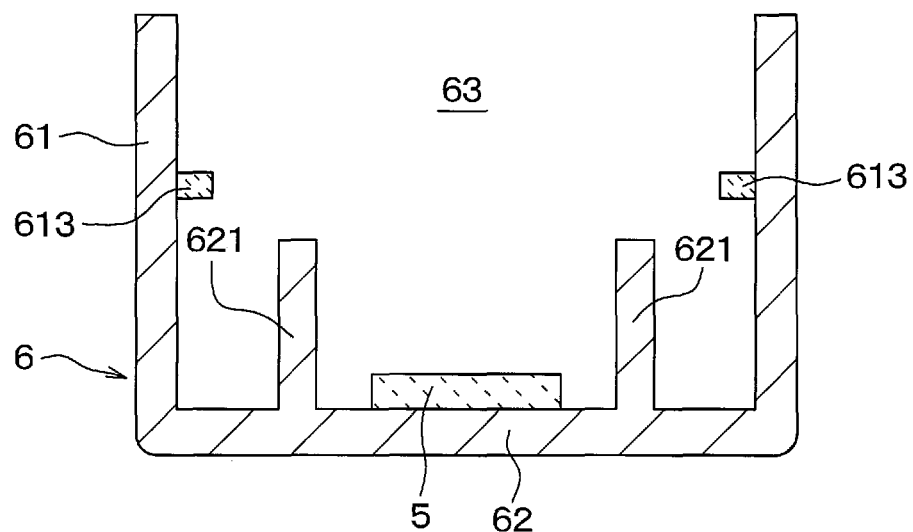
FIG. 23A is a diagram showing a forming process of a convex portion for supporting a foam member in the forming process of the protection member shown in FIG. 22.

The convex portion 613 is formed of any material such as silicone resin material, for example. As shown in FIG. 23A, the convex portion 613 may be formed by coating an adhesive (not shown) at a portion of an inner wall of the side plate portion 61 which is higher than the tip end portion of the protrusions 621 and attaching the convex portion 613 to the portion of the inner wall of the side plate portion 61. The convex portion 613 may be formed in a ring shape which is continuously formed on the entire periphery of the inner wall of the side plate portion 61, or may be formed intermittently, as long as the foam member is prevented from falling down on the bottom plate portion 62. Further, the shape, the size and the dimension of the convex portion 613 can be appropriately changed.

Figure 23B:
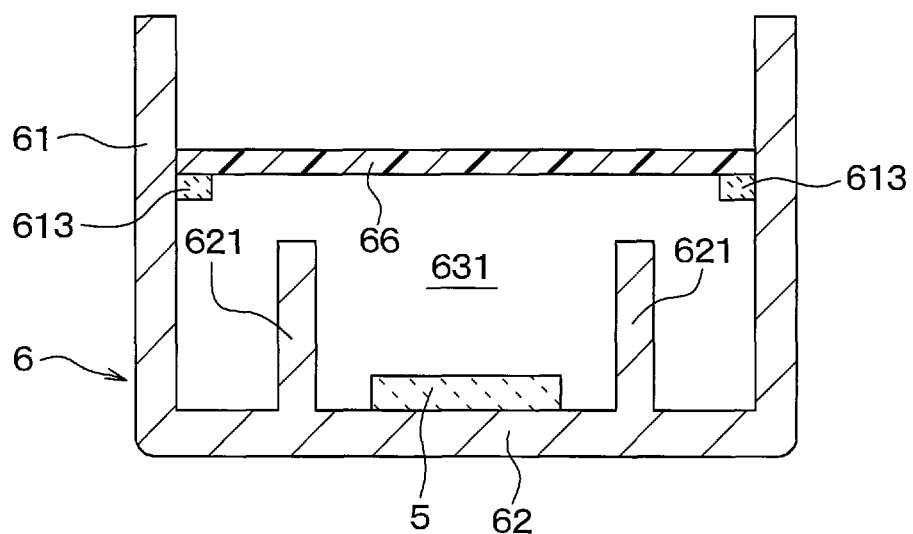
FIG. 23B is a diagram showing an arrangement process of a foam member as a forming process of the protection member subsequent to FIG. 23A.

According to the present modification, the convex portion 613 is formed and then the foam member 66 is disposed on the convex portion 613 as shown in FIG. 23B. Thus, the closed space 631 that accommodates the protrusions 621 is formed, where the foam member 66 supported by the convex portion 613 does not contact with the protrusions 621. Hence, this configuration accomplishes both of a protection of a circuit (not shown) and maintenance of vibration characteristics of the protrusions 621.

According to the present modification, the ultrasonic sensor in which similar effect to the above-described fourth embodiment is provided.

Fifth Embodiment

Figure 24:
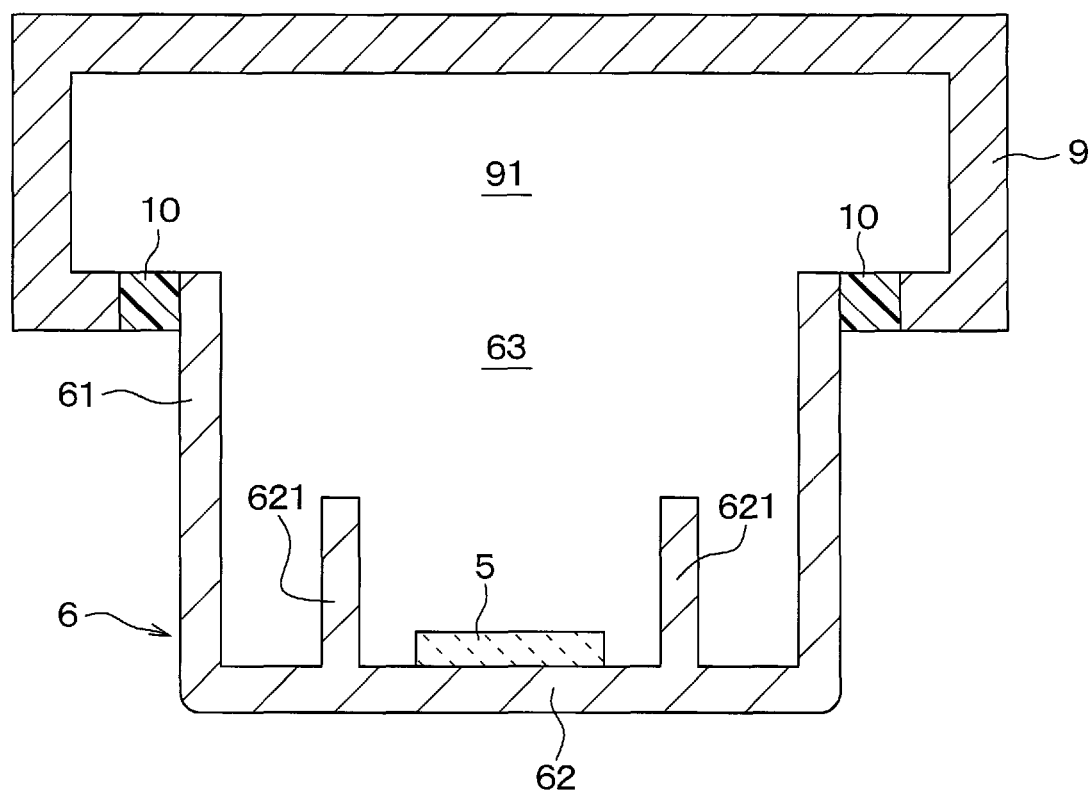
FIG. 24 is a diagram showing an overall configuration of an ultrasonic microphone in an ultrasonic sensor according to a fifth embodiment, which corresponds to FIG. 13.

With reference to FIG. 24, an ultrasonic sensor according to a fifth embodiment will be described.

The present embodiment differs from the above-described first embodiment in that the ultrasonic sensor is attached to a housing 19 via an unshown adhesive on an outer wall surface of the side plate portion 61 of the element accommodating case 6 and a waterproof member 10, and the inner space 63 together with the inner space 91 of the housing 9 are closed by the housing 9.

For example, the housing 9 is configured of any metal material, and is attached to the outer wall surface as an outer periphery side of the side plate portion 61 via an unshown adhesive and the waterproof member 10. That is, the housing 9 is arranged outside the element accommodating case 6, covering a circuit (not shown) which is connected to the ultrasonic element 5 to avoid being exposed to outside air, thereby forming the closed space for the circuit protection.

Note that other member such as unshown circuit boards may be arranged in the inner space 91 of the housing 9. However, in this case, other members are arranged not to contact with at least the protrusions 621.

The waterproof member 10 is made of any resin material such as waterproof rubber, for example. The waterproof member 10 suppresses moisture in the air from entering inside the housing 9 from outside. The waterproof member 10 is attached to the housing 9 by any method, and may be attached to the element accommodating case 6 by an adhesive (not shown) or the like.

According to the ultrasonic sensor of the present embodiment, since it is configured that an unshown circuit in the element accommodating case 6 is prevented from being exposed to outside air, and other members do not contact the protrusions 621, both circuit protection and maintenance of the vibration characteristics can be accomplished.

According to the present embodiment, similar to that of the above-described third embodiment, the ultrasonic sensor is provided in which both circuit protection and maintenance of the vibration characteristics are accomplished, in addition to the effects and advantages of the above-described first embodiment.

Other Embodiments

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

(1) For example, the ultrasonic sensor 1 is not limited to a configuration capable of transmitting and receiving the ultrasonic waves, but may be a configuration capable of only transmitting the ultrasonic waves. Alternatively, the ultrasonic sensor 1 may be configured to have only a function of receiving reflected waves of probing waves as ultrasonic waves transmitted by other ultrasonic transmitter, the reflected waves being reflected at an object existing around the other ultrasonic transmitter. The ultrasonic microphone 4 may be configured for transmitting and receiving, or for transmitting, or for receiving.

(2) The outline shape of the ultrasonic microphone 4, that is, the element accommodating case 6 is not limited to substantially cylindrical shape but may be a substantially regular hexagonal pillar shape, substantially regular octagonal pillar shape and the like.

(3) The ultrasonic element 5 is not limited to a piezoelectric element, but an electrostatic capacitance type element may be employed, for example.

(4) In the above description, a plurality of constituents integrally formed without any joints may be formed by attaching mutually separated members. Similarly, the plurality of constituents formed by attaching mutually separated members may be integrally formed without any joints. For example, the element accommodating case 6 may be configured such that a plurality of separated members are joined by welding or bonding.

(5) In the above description, a plurality of constituents formed by mutually the same material may be formed of mutually different materials. Similarly, a plurality of constituents formed of mutually different materials may be formed of mutually the same material.

(6) The protrusions 621 is constituted integrally with the element accommodating case 6 using a material the same as that of the element accommodating case 6.

However, the protrusions 621 may be constituted of a material different from that of the element accommodating case 6. In this case, the protrusions 621 may be formed separately with other parts of the element accommodating case 6, which may be attached by any adhesive material, or may be integrated with the bottom plate portion 62 by welding or the like. Thus, compared to a case where the protrusions 621 are integrally formed with the element accommodating case 6 with the same material, effects of a cost reduction in the manufacturing can be obtained. Further, the protrusions 621 may be formed by a material different from the bottom plate portion 62, that is, a material in which the propagation speed of ultrasonic vibration is different, whereby a propagation of the vibration of the ultrasonic microphone 4 can be controlled.

(7) In the case where two protrusions 621 are formed on the bottom plate portion 62, the two protrusions 621 may have shapes and dimensions being mutually different other than a case of having the same shape and dimension.

(8) The number of protrusions 621 is not limited to examples of the above-described embodiments, but three or more protrusions 623 may be provided.

(9) The shape of protrusions is not limited to a simple column shape or plate shape, but may be shapes other than the above-described shapes, for example, a spindle shape such as a conical shape or a notch portion may be formed at the protrusions. Note that the shape of the protrusions 621 may be changed, whereby a balance in the weight and the thickness is adjusted so as to change the frequency of the resonant vibration or degree of vibration.

(Conclusion)

As described, the present disclosure relates to an ultrasonic sensor having a plurality of resonance frequencies while securing the durability.

According to one aspect of the present disclosure, an ultrasonic sensor is provided with an ultrasonic element that converts between an electrical signal and an ultrasonic vibration and an element accommodating case having a bottomed cylindrical shape and accommodating the ultrasonic element inside thereof, in which the element accommodating case includes a side plate portion formed in a cylindrical shape that surrounds a directional center axis (DA), and a bottom plate portion that closes one end side of the side plate portion in an axial direction which is parallel to the directional center axis, the ultrasonic element is attached to the bottom plate portion, and the bottom plate portion includes at least one protrusion; and the protrusions vibrate together with the bottom plate portion when the bottom plate portion vibrates as ultrasonic vibration.

Thus, the ultrasonic sensor is configured to include an element accommodating case in which at least one protrusions is arranged on the bottom plate portion between a portion where the ultrasonic element is attached and the side plate portion, and is configured such that the protrusions vibrate together with the bottom plate portion vibration when the bottom plate portion vibrates as ultrasonic vibration.

According to this ultrasonic sensor, in the bottom plate portion including the protrusions, that is, the bottom plate portion in which a thickness thereof is partially different, the impedance of the ultrasonic vibration changes in the bottom plate portion. Then, a first vibration mode and a second vibration mode occur in the ultrasonic sensor, causing a plurality of resonance frequencies. The first vibration mode occurs when the ultrasonic waves mainly propagate to the side plate portion. The second vibration mode occurs when the ultrasonic waves propagate to the protrusion from the bottom plate portion. Further, a structure in which the protrusions are provided on the bottom plate portion has improved durability compared to a structure in which two bottomed cylindrical shaped cases are joined. Therefore, an ultrasonic sensor is provided having a plurality of resonant frequencies while securing the durability thereof.

What is claimed is:

1. An ultrasonic sensor comprising:
an ultrasonic element that converts between an electrical signal and an ultrasonic vibration; and
an element accommodating case having a bottomed cylindrical shape and accommodating the ultrasonic element inside thereof,
wherein
the element accommodating case includes a side plate portion formed in a cylindrical shape that surrounds a directional center axis, and a bottom plate portion that closes one end side of the side plate portion in an axial direction which is parallel to the directional center axis,
the ultrasonic element is attached to the bottom plate portion,
the bottom plate portion includes at least one protrusions,
the protrusions vibrate together with the bottom plate portion when the bottom plate portion vibrates as an ultrasonic vibration, and
the protrusions are arranged at portions where a loop or node of standing waves is formed when the bottom plate portion vibrates as an ultrasonic vibration causing the standing waves.

2. The ultrasonic sensor according to claim 1, wherein the side plate portion includes
a thin wall portion formed in a cylindrical shape or a partially cylindrical shape having a predetermined thickness in a radial direction orthogonal to the directional center axis, and
a thick wall portion provided in a part of the thin wall portion in a circumferential direction that surrounds the directional center axis, having a dimension in a radial direction larger than the predetermined thickness.

3. The ultrasonic sensor according to claim 1, wherein the bottom plate portion is provided with two protrusions.

4. The ultrasonic sensor according to claim 3, wherein the protrusions are arranged symmetrically with respect to the ultrasonic element in the bottom plate portion.

5. The ultrasonic sensor according to claim 1, wherein the protrusions are formed by a material different from a material that forms the bottom plate portion.

6. The ultrasonic sensor according to claim 1, wherein the protrusions are formed in any one of a rod shape, a plate shape and a spindle shape.

7. The ultrasonic sensor according to claim 1, wherein the protrusions include a vibration attenuation unit that attenuates a reverberation vibration which is an unintentional vibration occurring in the protrusions after externally transmitting the ultrasonic waves.

8. The ultrasonic sensor according to claim 7, wherein the vibration attenuation unit is a piezoelectric element.

9. The ultrasonic sensor according to claim 8, wherein the vibration attenuation unit is connected to a control unit that controls a state of vibration of the vibration attenuation unit.

10. The ultrasonic sensor according to claim 9, wherein the control unit is configured to control the vibration attenuation unit to vibrate in a direction where a vibration of the protrusions occurs, when externally transmitting the ultrasonic waves, and to control the vibration attenuation unit to vibrate in a direction where the reverberation vibration of the protrusions is cancelled during a predetermined period until reflected waves of the ultrasonic waves transmitted externally are received, after externally transmitting the ultrasonic waves.

11. The ultrasonic sensor according to claim 7, wherein the vibration attenuation unit is configured to convert the reverberation vibration into electrical energy, and is connected to an external element that consumes the converted electrical energy), and
a switch is disposed between the vibration attenuation unit and the external element to switch a connection therebetween.

12. The ultrasonic sensor according to claim 7, wherein the vibration attenuation unit is attached to a predetermined region in the protrusions at least including a portion having the largest displacement due to the reverberation vibration.

13. The ultrasonic sensor according to claim 1, wherein the element accommodating case includes a protection member that closes an other end side opposite to the bottom plate portion in the side plate portion and protects the protrusions, and
the protection member is disposed with a distance from the protrusions.

14. The ultrasonic sensor according to claim 13, wherein
the protection member is configured of a base portion including a through hole and a closing member that closes an end portion side opposite to the bottom plate portion in the through hole,
the through hole is formed to be larger than an outline of the protrusions, and the base portion is attached to the element accommodating case such that the protrusions are each arranged inside the through hole, and
the closing member is disposed with a distance from the protrusions.

15. The ultrasonic sensor according to claim 13 further comprising a foam member disposed between the protection member and the bottom plate portion such that the foam member is disposed with a distance from the protrusions, wherein
the foam member includes a concave portion having an inner diameter which is larger than an outline of the protrusions, the concave portion accommodating the protrusions thereinside.

16. The ultrasonic sensor according to claim 13, wherein
the side plate portion includes a convex portion provided at a portion of which the height from the bottom plate portion is higher than that of the protrusions,
the ultrasonic sensor further comprising a foam member disposed on the convex portion with a distance from the protrusions, the foam member separating between the protrusions and the protection member, and
the protection member is being contacted with the foam member.

17. The ultrasonic sensor according to claim 1, wherein
the ultrasonic sensor further comprising a housing attached to a part of the side plate portion in an outer periphery side,
an inner space of the element accommodating case in which the ultrasonic element is arranged, and an inner space of the housing are closed by the housing.

\* \* \* \* \*